US007847806B2

(12) United States Patent
Mochizuki et al.

(10) Patent No.: US 7,847,806 B2
(45) Date of Patent: Dec. 7, 2010

(54) IMAGE PROCESSING METHOD, IMAGE PROCESSING APPARATUS, AND PRINTING APPARATUS

(75) Inventors: Yausushi Mochizuki, Ohta-ku (JP); Takayuki Suzuki, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 10/672,727

(22) Filed: Sep. 25, 2003

(65) Prior Publication Data

US 2004/0070689 A1   Apr. 15, 2004

(30) Foreign Application Priority Data

Sep. 27, 2002   (JP)   ............... 2002-284240

(51) Int. Cl.
*G09G 5/30* (2006.01)
(52) U.S. Cl. .............. 345/619; 345/620; 345/428; 345/581
(58) Field of Classification Search ......... 345/619, 345/620, 428, 581; 348/221, 221.1
See application file for complete search history.

(56) References Cited

U.S. PATENT DOCUMENTS

| | | | |
|---|---|---|---|
| 259,950 A * | 6/1882 | Van Hoevenbergh | 352/99 |
| 3,593,432 A * | 7/1971 | Reynolds | 434/257 |
| 4,899,227 A * | 2/1990 | Yamada | 358/452 |
| 5,001,574 A * | 3/1991 | Shimizu et al. | 358/448 |
| 5,179,370 A * | 1/1993 | Sato | 345/628 |
| 5,227,824 A * | 7/1993 | Yoshida et al. | 396/60 |
| 5,333,213 A * | 7/1994 | Koyama et al. | 382/283 |
| 5,430,832 A * | 7/1995 | Imaizumi et al. | 345/620 |
| 5,442,739 A * | 8/1995 | Saito | 345/676 |

(Continued)

FOREIGN PATENT DOCUMENTS

JP   5-244496 A   9/1993

(Continued)

OTHER PUBLICATIONS

Object-Based Image Editing; International Conference on Computer Graphics and Interactive Techniques archive Proceedings of the 29th annual conference on Computer graphics and interactive techniques table of contents San Antonio, Texas SESSION: Painting and non-photorealistic graphics table of contents pp. 777-784 Year of Publication:Jul. 2002.*

(Continued)

*Primary Examiner*—Javid A Amini
(74) *Attorney, Agent, or Firm*—Canon U.S.A. Inc., I.P. Division

(57) ABSTRACT

A desired range of moving image data is designated. Then, still images obtained from a start frame and an end frames in the designated range are displayed, and an interface for designating trimming areas is provided for the two frames. The trimming areas are set in a predetermined frame to be extracted from the designated range based on the trimming areas designated by using the interface. The predetermined number of frames is extracted from the designated range of the moving image data, a partial image in the set trimming areas is extracted from the extracted predetermined number of frames, and a predetermined number of continuous still images are generated. The obtained continuous still image is printed onto a recording sheet via a printing device.

30 Claims, 18 Drawing Sheets

U.S. PATENT DOCUMENTS

| | | | | |
|---|---|---|---|---|
| 5,566,004 | A * | 10/1996 | Imaizumi et al. | 358/450 |
| 5,805,132 | A * | 9/1998 | Imaizumi et al. | 345/418 |
| 5,819,016 | A * | 10/1998 | Watanabe et al. | 345/419 |
| 5,870,683 | A * | 2/1999 | Wells et al. | 455/566 |
| 5,937,069 | A * | 8/1999 | Nagai et al. | 713/162 |
| 6,002,850 | A * | 12/1999 | Sumino et al. | 719/315 |
| 6,016,362 | A * | 1/2000 | Kato et al. | 382/232 |
| 6,118,925 | A * | 9/2000 | Murata et al. | 386/83 |
| 6,157,392 | A * | 12/2000 | McKeeth | 345/473 |
| 6,204,878 | B1 * | 3/2001 | Hieda | 348/240.99 |
| 6,236,389 | B1 * | 5/2001 | Imaizumi et al. | 715/788 |
| 6,313,923 | B1 * | 11/2001 | Takanashi et al. | 358/1.18 |
| 6,321,024 | B1 * | 11/2001 | Fujita et al. | 386/55 |
| 6,330,051 | B1 * | 12/2001 | Takanashi | 355/40 |
| 6,339,465 | B1 * | 1/2002 | Takanashi et al. | 355/18 |
| 6,393,134 | B1 * | 5/2002 | Tostevin et al. | 382/100 |
| 6,407,757 | B1 * | 6/2002 | Ho | 715/776 |
| 6,473,153 | B2 * | 10/2002 | Iguchi et al. | 355/40 |
| 6,507,703 | B1 * | 1/2003 | Ishito | 396/60 |
| 6,529,206 | B1 * | 3/2003 | Ohki et al. | 345/619 |
| 6,546,188 | B1 * | 4/2003 | Ishii et al. | 386/52 |
| 6,563,596 | B1 * | 5/2003 | Narushima | 358/1.14 |
| 6,690,878 | B1 * | 2/2004 | Jeong et al. | 386/52 |
| 6,750,903 | B1 * | 6/2004 | Miyatake et al. | 348/218.1 |
| 6,766,065 | B1 * | 7/2004 | Yamamoto | 382/282 |
| 6,819,359 | B1 * | 11/2004 | Oda | 348/247 |
| 6,834,127 | B1 * | 12/2004 | Yamamoto | 382/282 |
| 7,065,294 | B2 * | 6/2006 | Kamata | 396/60 |
| 7,265,763 | B2 * | 9/2007 | Bossut et al. | 345/629 |
| 7,286,161 | B2 * | 10/2007 | Watanabe et al. | 348/207.2 |
| 7,317,479 | B2 * | 1/2008 | Cazier et al. | 348/240.99 |
| 7,333,242 | B2 * | 2/2008 | Yamamoto | 358/2.1 |
| 7,340,097 | B2 * | 3/2008 | Kondo et al. | 382/190 |
| 7,639,254 | B2 * | 12/2009 | Takiguchi et al. | 345/428 |
| 2001/0006391 | A1 * | 7/2001 | Sawano et al. | 345/418 |
| 2002/0032696 | A1 * | 3/2002 | Takiguchi et al. | 707/500.1 |
| 2002/0054316 | A1 * | 5/2002 | Abe | 358/1.14 |
| 2002/0071144 | A1 * | 6/2002 | Baba et al. | 359/23 |
| 2002/0085771 | A1 * | 7/2002 | Sakuramoto | 382/282 |
| 2002/0093587 | A1 * | 7/2002 | Michel | 348/452 |
| 2002/0113796 | A1 * | 8/2002 | Oshiyama et al. | 345/581 |
| 2002/0122588 | A1 * | 9/2002 | Yamamoto | 382/167 |
| 2002/0196970 | A1 * | 12/2002 | Sano et al. | 382/166 |
| 2003/0071908 | A1 * | 4/2003 | Sannoh et al. | 348/345 |
| 2003/0081260 | A1 | 5/2003 | Suzuki | |
| 2003/0123756 | A1 * | 7/2003 | Yamamoto | 382/309 |
| 2003/0184770 | A1 * | 10/2003 | Motoki et al. | 358/1.2 |
| 2003/0202110 | A1 * | 10/2003 | Owens et al. | 348/222.1 |
| 2003/0214128 | A1 * | 11/2003 | Roberts et al. | 281/31 |
| 2003/0219242 | A1 * | 11/2003 | Kamata | 396/6 |
| 2004/0257623 | A1 * | 12/2004 | Suzuki | 358/3.03 |
| 2005/0226504 | A1 * | 10/2005 | Kondo et al. | 382/173 |
| 2006/0188175 | A1 * | 8/2006 | Takiguchi et al. | 382/284 |
| 2007/0263909 | A1 * | 11/2007 | Ojima et al. | 382/118 |

FOREIGN PATENT DOCUMENTS

| | | | | |
|---|---|---|---|---|
| JP | 8-265703 | A | | 10/1996 |
| JP | 11-112868 | A | | 4/1999 |
| JP | 11-191841 | A | | 7/1999 |
| JP | 2001-223876 | A | | 8/2001 |
| JP | 2001223876 | A | * | 8/2001 |
| JP | 2003-143537 | A | | 5/2003 |

OTHER PUBLICATIONS

Vision-assisted image editing; ACM SIGGRAPH Computer Graphics archive vol. 33, Issue 4 (Nov. 2000) table of contents pp. 55-57 Year of Publication: 1999.*

Impact: an Interactive Natural-Motion-Picture Dedicated Multimedia Authoring System; Hirotada Ueda, Takafmi Miyatake, and Satoshi Yoshizawa; Mar. 1991 ACM.*

A semi-automatic approach to home video editing Andreas Girgensohn, John Boreczky, Patrick Chiu, John Doherty, Jonathan Foote, Gene Golovchinsky, Shingo Uchihashi, Lynn Wilcox Nov. 2000 Proceedings of the 13th annual ACM symposium on User interface software and technology Publisher: ACM Press.*

A multi-view intelligent editor for digital video libraries Brad A. Myers, Juan P. Casares, Scott Stevens, Laura Dabbish, Dan Yocum, Albert Corbett Jan. 2001, Proceedings of the 1st ACM/IEEE-CS joint conference on Digital libraries Publisher: ACM Press.*

Applications: Tour into the video: image-based navigation scheme for video sequences of dynamic scenes Hyung Woo Kang, Sung Yong Shin, Nov. 2002, Proceedings of the ACM symposium on Virtual reality software and technology Publisher: ACM Press.*

Salient video stills: content and context preserved Laura Teodosio, Walter Bender, Sep. 1993, Proceedings of the first ACM international conference on Multimedia Publisher: ACM Press.*

Geometric compression through topological surgery; ACM Transactions on Graphics (TOG) archive, vol. 17, Issue 2 (Apr. 1998) table of contents, pp. 84-115, Year of Publication: 1998.*

Session 7: content watermarking: Missing data correction in still images and image sequences Raphaël Bornard, Emmanuelle Lecan, Louis Laborelli, Jean-Hugues Chenot, Dec. 2002, Proceedings of the tenth ACM international conference on Multimedia, Publisher: ACM Press.*

Session 11: multimedia analysis and retrieval: A user attention model for video summarization Yu-Fei Ma, Lie Lu, Hong-Jiang Zhang, Mingjing Li, Dec. 2002, Proceedings of the tenth ACM international conference on Multimedia Publisher: ACM Press.*

ARToolkit, which is described in X. Zhang, S. Fronz, N. Navab: "Visualmarker detection and decoding in AR systems: A comparative study," Proc. of International Symposium on Mixed and Augmented Reality (ISMAR'02), 2002.

* cited by examiner

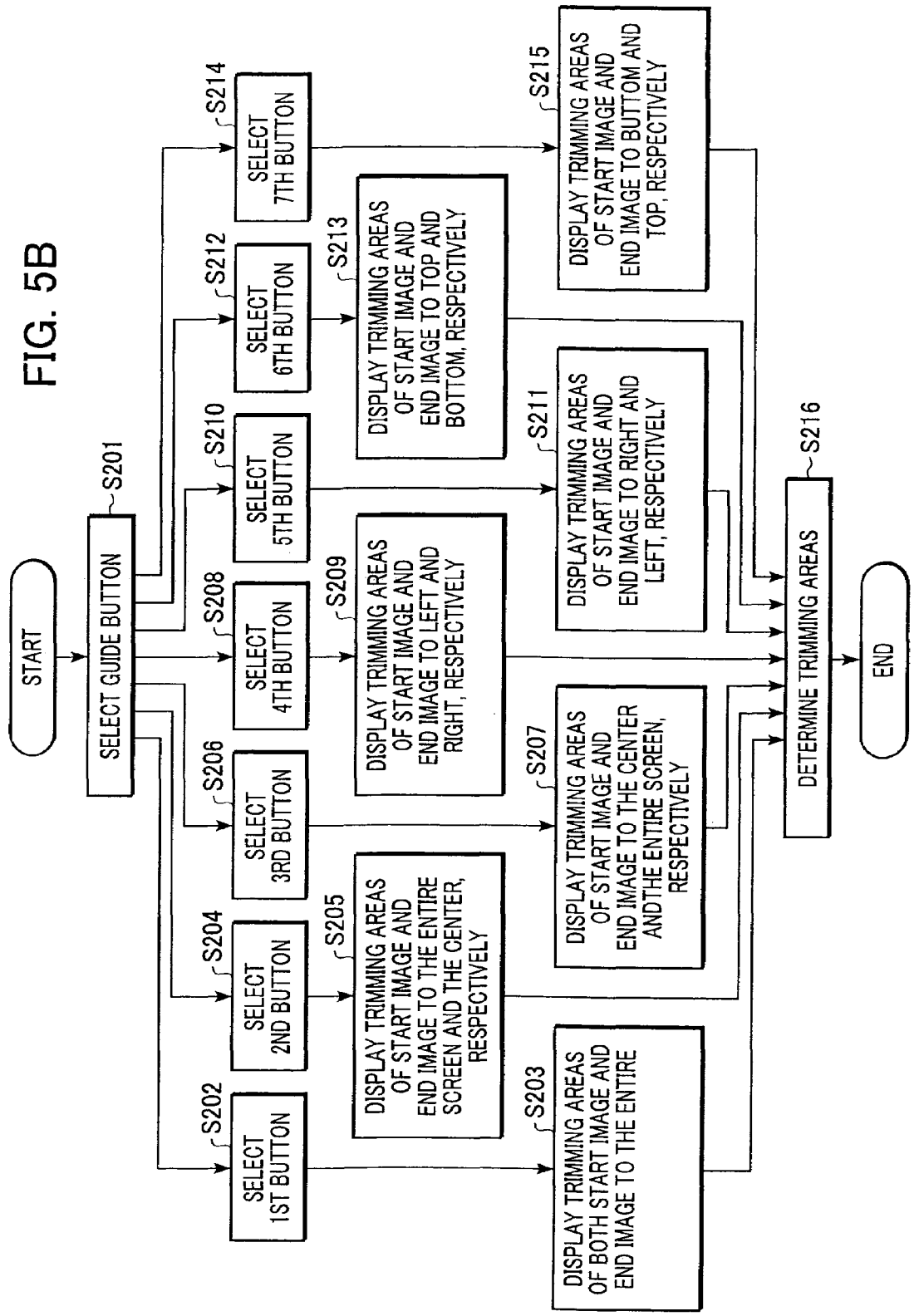

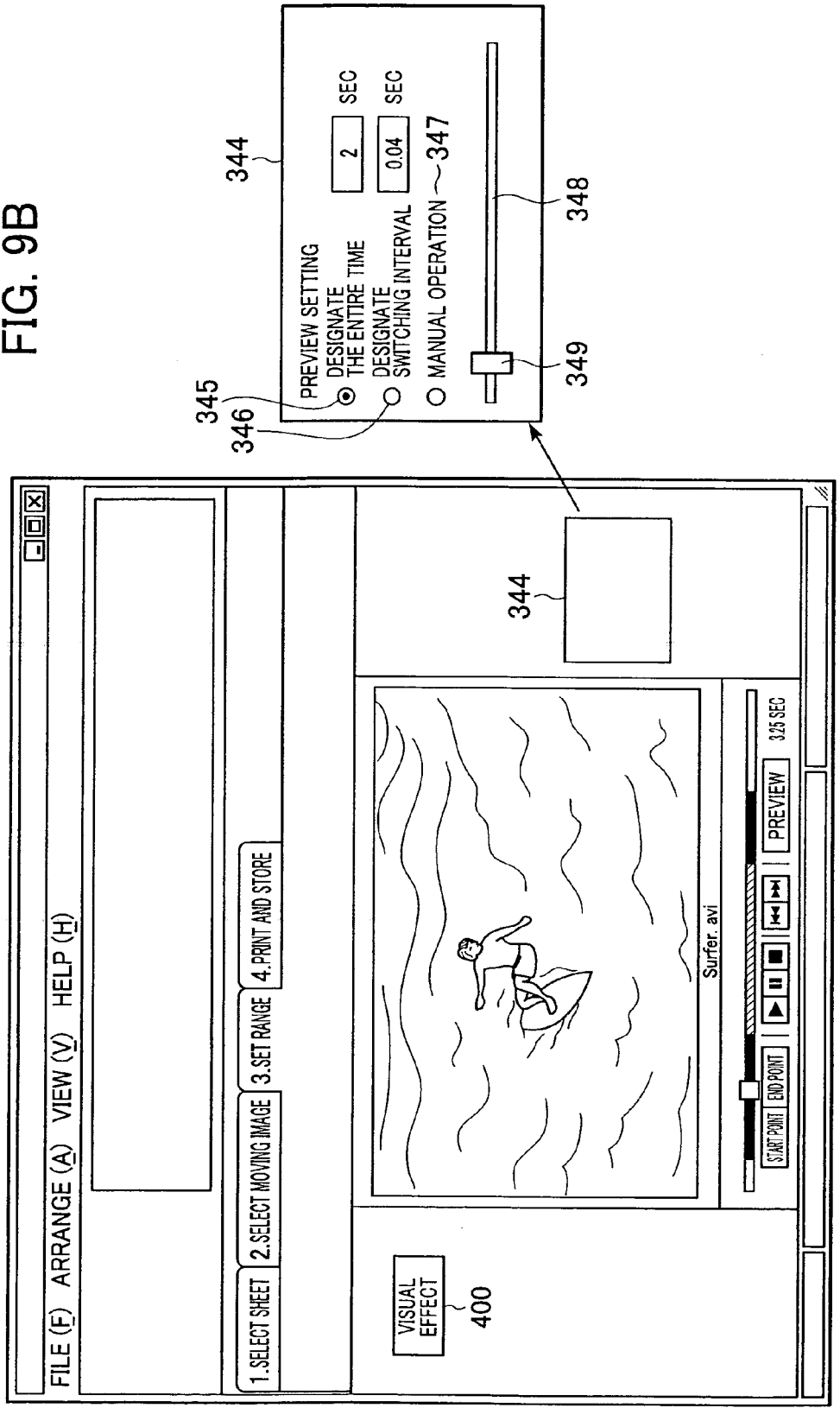

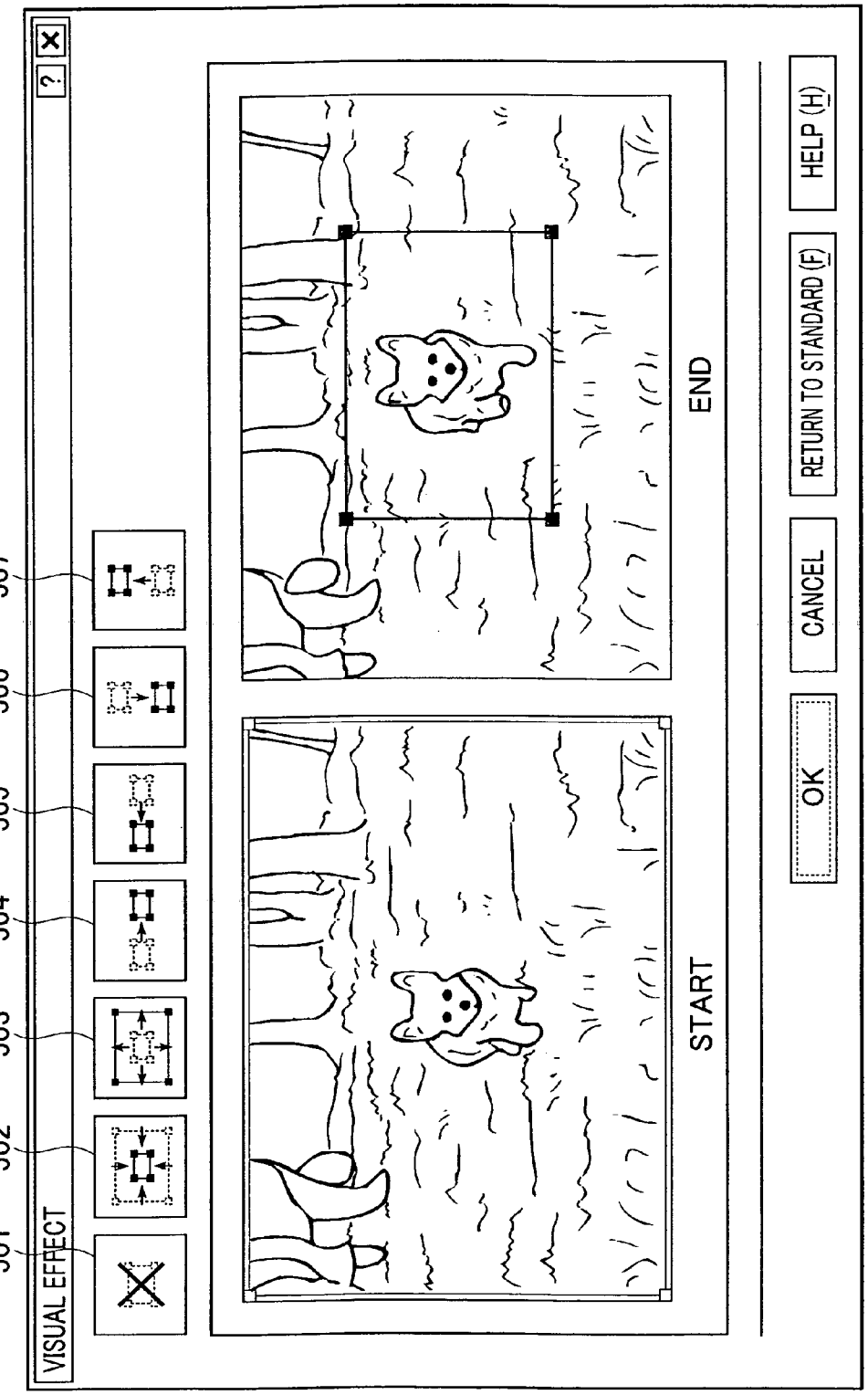

IMAGE PROCESSING METHOD, IMAGE PROCESSING APPARATUS, AND PRINTING APPARATUS

BACKGROUND OF THE INVENTION

1. Field of the Invention

The present invention relates to an image processing method, an image processing apparatus, and a printing apparatus for printing out a plurality of images obtained from moving image data.

2. Description of the Related Art

A conventional system is proposed for cutting out a plurality of still images from a moving image file and for printing the cut-out still images onto sheets like oblong cards so as to provide a printing material by which a pseudo moving image can be observed by turning the sheets like the oblong cards as shown in FIG. 15 (hereinbelow, the above-mentioned moving image is referred to as a "turning moving-image", and the still images for providing the turning moving-image are referred to as "continuous still images"). In the system, frames from a start image designated by means for designating the start image from the moving image file to an end image designated by means for designating the end image are cut out at a predetermined interval, thereby obtaining the continuous still images. The obtained continuous still images are printed, thereby providing the printing material which enables the enjoyment of the "turning moving-image".

However, since the "turning moving-image" including the moving image file is conventionally enjoyed at the predetermined interval, obviously, the moving image with small motion becomes the "turning moving-image" with the small motion.

It is an object of the present invention to generate the continuous still images by using an trimming area to be extracted from the frames in consideration of the above problems.

SUMMARY OF THE INVENTION

There is provided an image processing apparatus comprising: designating means which designates a desired range of moving image data; designating means which designates trimming areas of at least two frames from a predetermined number of frames to be cut out from the range designated by the designating means; setting means which sets the trimming areas of the predetermined number of frames to be cut out based on the trimming areas designated by the designating means; generating means which cuts out the predetermined number of frames from the range designated by the designating means, extracts the trimming areas set by the setting means, and generates a predetermined number of continuous still images; and printing control means which prints the continuous still images generated by the generating means.

Further objects, features and advantages of the present invention will become apparent from the following description of the preferred embodiments (with reference to the attached drawings).

BRIEF DESCRIPTION OF THE DRAWINGS

FIG. 5B is a flowchart for explaining processing for setting a visual effect.

FIG. 9B is a diagram showing another display example of the range setting screen.

FIG. 11 is a diagram showing the setting of a trimming area when the zoom-in operation is set.

DESCRIPTION OF THE PREFERRED EMBODIMENTS

Hereinbelow, a description is given of a preferred embodiment of the present invention with reference to the attached drawings.

[System Structure]

Figure 1:
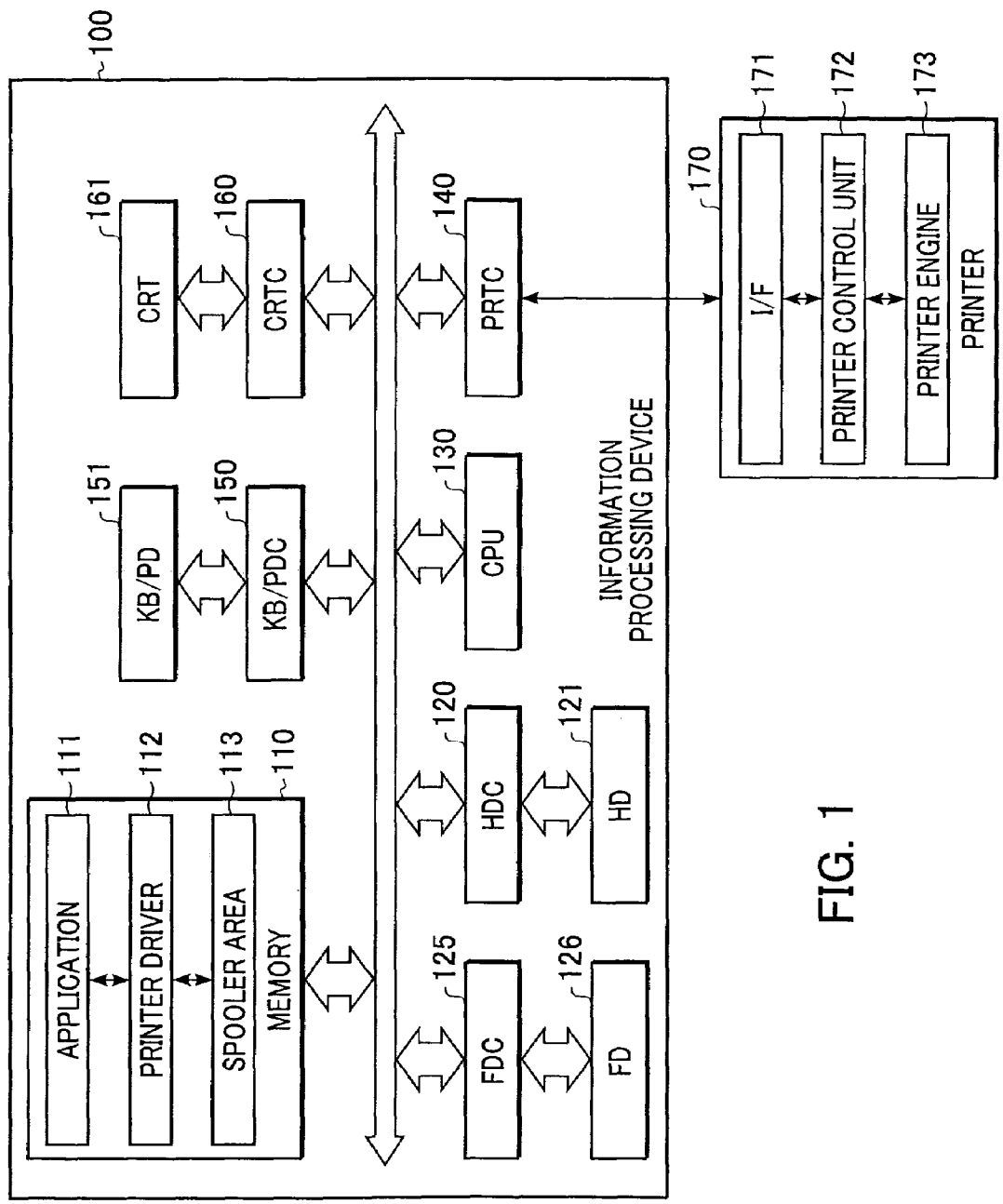
FIG. 1 is a block diagram showing the structure of an image forming system according to an embodiment of the present invention.

FIG. 1 is a block diagram showing the structure of an image forming system according to the embodiment of the present invention. The image forming system according to the embodiment comprises an information processing device 100 for generating print data (including a control command) and a printer 170 for forming an image based on the print data.

The information processing device 100 comprises: a memory 110; a CPU 130; a hard disk controller (HDC) 120; a hard disk (HD) 121 connected to the HDC 120; a floppy (registered trademark) disk drive (FD) 126; a printer controller (PRTC) 140; a keyboard/pointing device controller (KB/PDC) 150; a keyboard (KB) and pointing device (PD) 151 connected to the KB/PDC 150; a CRT controller (CRTC) 160; and a CRT 161 connected to the CRTC 160.

A mouse is used as the pointing device (PD) according to the embodiment. However, various devices such as a track ball and a touch panel are used as the PD. The CRT 161 is used as a display device in the above structure. Obviously, another-type display device, e.g., a liquid crystal display device and a plasma display device may be used as the display device.

The memory 110 comprises: application 111 for processing for image editing according to the embodiment; a printer driver 112 as software for generating print data corresponding to the printer 170; a spooler area 113 for spooling the print data to be supplied to the printer 170; an OS (Operating System) (not shown); a work area; and the like.

The CPU 130 is operated based on the application 111, the printer driver 112, and the OS in the memory 110. Incidentally, the CPU 130 is booted by a boot program stored in a ROM (not shown) upon turning on power, an OS program is loaded to the memory 110 from the HD 121, and the OS is started. Subsequently, the application programs are loaded under the control of the OS and then are executed. Consequently, the CPU 130 functions as an image forming system. Of course, the CPU 130 can access the HD 121 via the HDC 120.

The PRTC 140 sequentially transmits, to the printer 170, the print data stored in the spooler area 113. The KB/PDC 150 controls the KB/PD 151 and captures instruction data from a user into the information processing device 100. The CRTC 160 is a controller which controls the CRT 161 as the display device. The KB/PDC 150, the KB/PD 151, the CRTC 160, and the CRT 161 form user interfaces.

The printer 170 comprises: an interface 171 for receiving the print data from the information processing device 100 and for sending notifications indicating various statuses to the information processing device 100; a printer control unit 172 for interpreting, mainly, the received print data and for generating bit map image data; and a printer engine 173 for receiving the bit map image data outputted from the printer control unit 172 and forming an actual image. Further, the printer 170 comprises an operation panel (not shown), etc. The printer engine 173 may use any system such as an ink-jet system, a digital photography system, and a thermal system.

When the printer 170 is connected to the information processing device 100 with the above-described structure, first, it is necessary to install the printer driver for generating the print data corresponding to the printer 170. Of course, the install operation may usually be performed once except for extraordinal reason.

Figure 2:
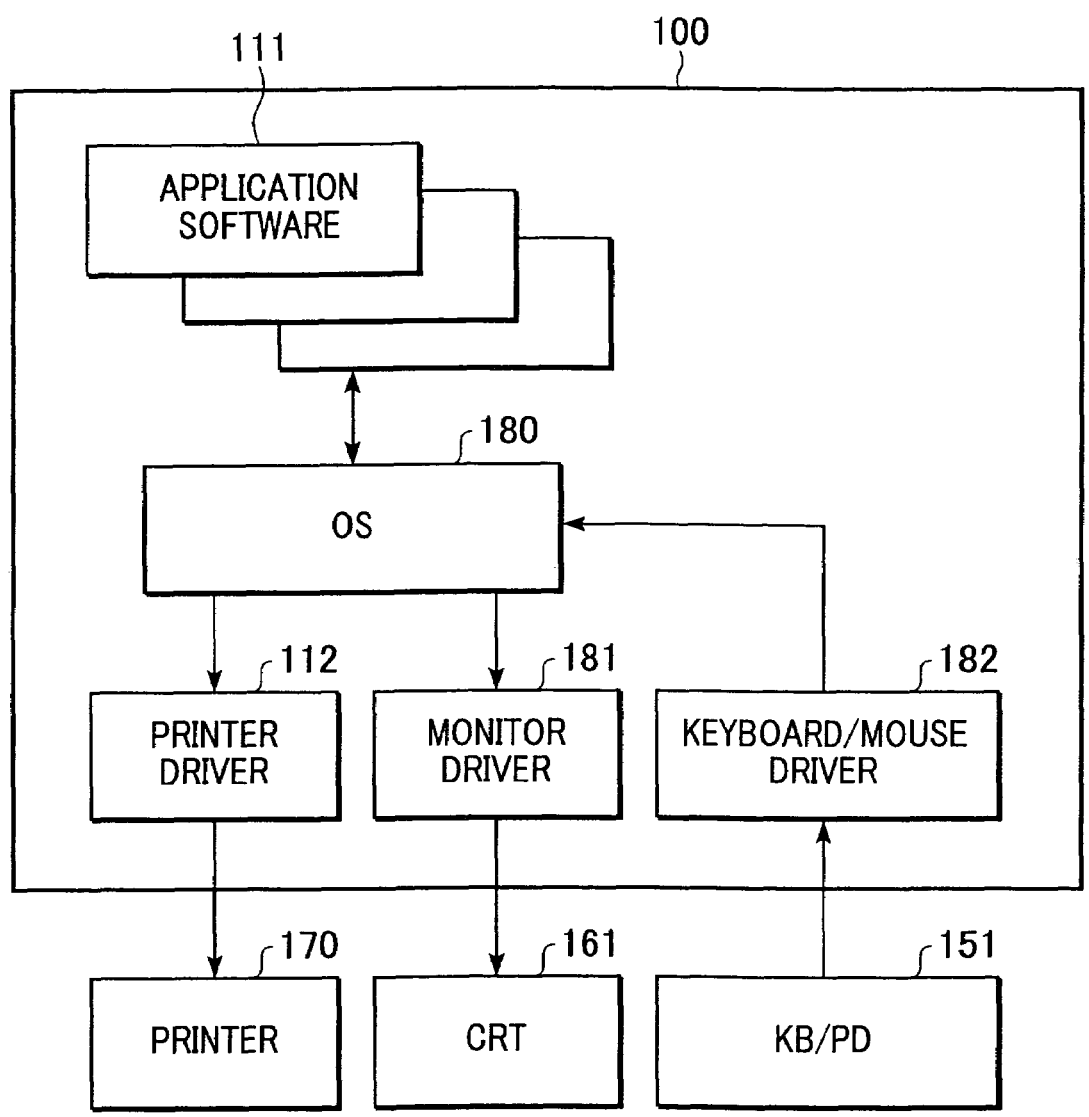
FIG. 2 is a diagram for explaining an information processing device 100 in the image forming system shown in FIG. 1 in views of the software structure.

FIG. 2 is a diagram for explaining the information processing device 100 in the image forming system shown in FIG. 1 in views of the software structure.

The keyboard or mouse (KB/PD) 151 is connected to the information processing device 100 as an input device. The CRT 161 as a monitor and the printer 170 as output devices are connected to the information processing device 100.

A keyboard/mouse driver 182 processes the input through the keyboard or the mouse and the processed input is transmitted to an OS 180. The information processing device 100 has application software 101 such as a word processor, spreadsheet, and Internet browser. Various drawing commands (image drawing command, text drawing command, and graphics drawing command) indicating an output image issued by the application software 101 are inputted to a monitor driver 181 via the OS 180. Upon printing, the drawing commands are inputted to the printer driver 112 via the OS 180. The printer driver 112 is software which processes the drawing commands, forms the print data, and prints the data on the printer 170. The monitor driver 181 is software which displays the image on the CRT 161.

As the information processing device 100 shown in FIGS. 1 and 2, a personal computer of the IBM AT compatible machine which is generally spread is used. As the OS 180, Windows 98 (registered trademark) produced by Microsoft Corporation is used. The monitor 106, the printer 105, and the keyboard mouse 112 are connected to the personal computer and printing processing application, which will be described later, is executed, thereby realizing the printing system according to the embodiment.

In the information processing device 100, the application software 111 forms output image data by using text data, graphics data, and image data which are classified into text, e.g., characters, graphics, e.g., drawing, and photographic image. Upon printing the image based on the output image data, the application software 111 requests a printing output to the OS 180, and issues, to the OS 180, drawings commands including a text drawing command corresponding to a text data portion, a graphics drawing command corresponding to a graphic data portion, and an image drawing command corresponding to an image data portion.

The OS 180 receives the request for the printing output from the application software 111 and, then, transmits the drawing commands to the printer driver 112 corresponding to the printer 170. The printer driver 112 processes the request for the printing output and the drawing commands transmitted from the OS 180, forms the print data which can be printed by the printer 170, and sends the printer 170 to the print data.

When the printer 170 is a raster printer, the printer driver 112 sequentially rasterizes the drawing commands to a band memory having each 8-bit depth of RGB. After rasterizing all the drawing commands, contents of a page memory are converted into data in a printable data format, e.g., CMYK data, and transmits the converted data to the printer 170. The band memory is assigned to the RAM (memory 110).

[Printing Processing Application]

Figure 10A:
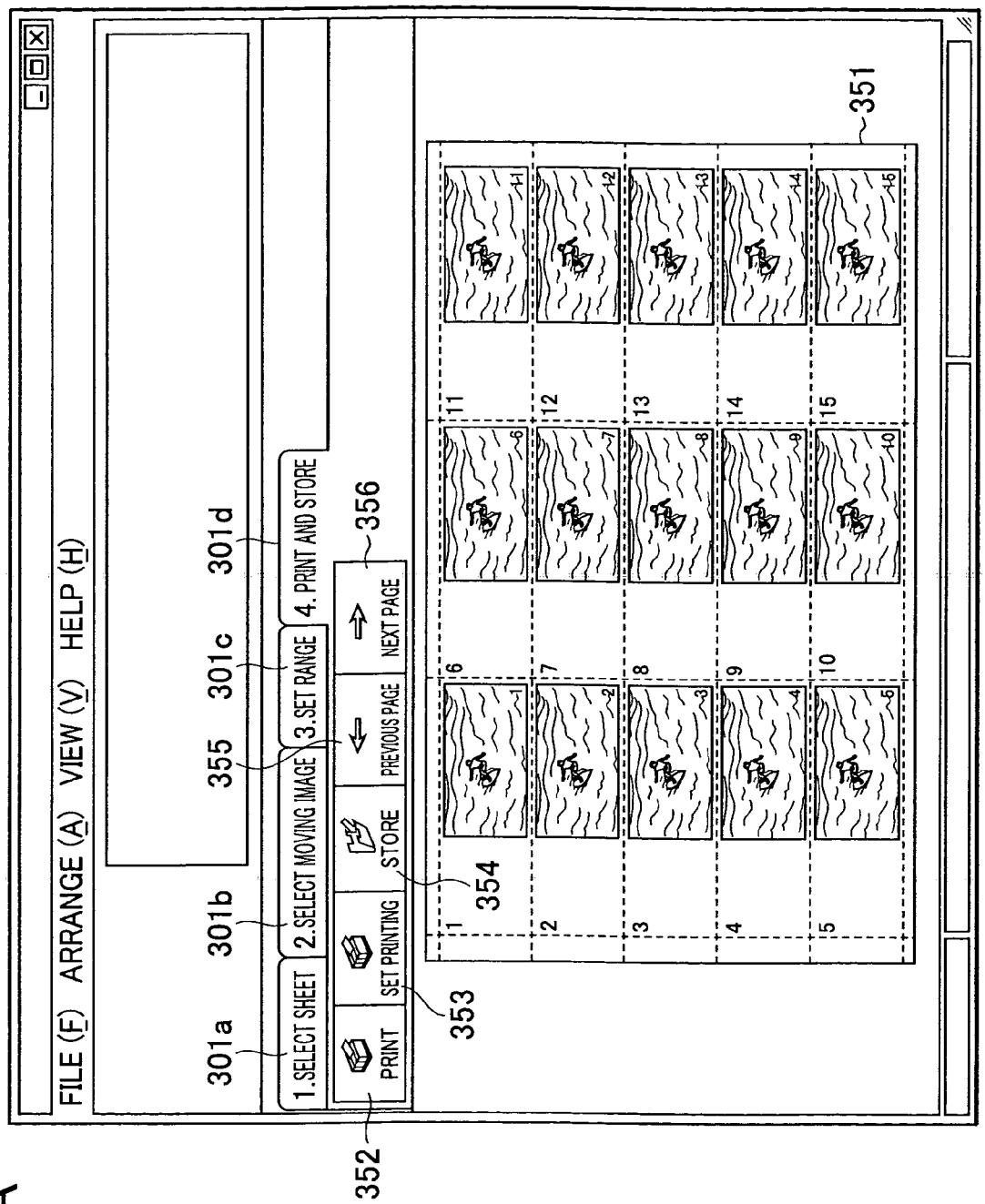
FIG. 10A is a diagram showing a display example of a printing and storing screen.
Figure 10B:
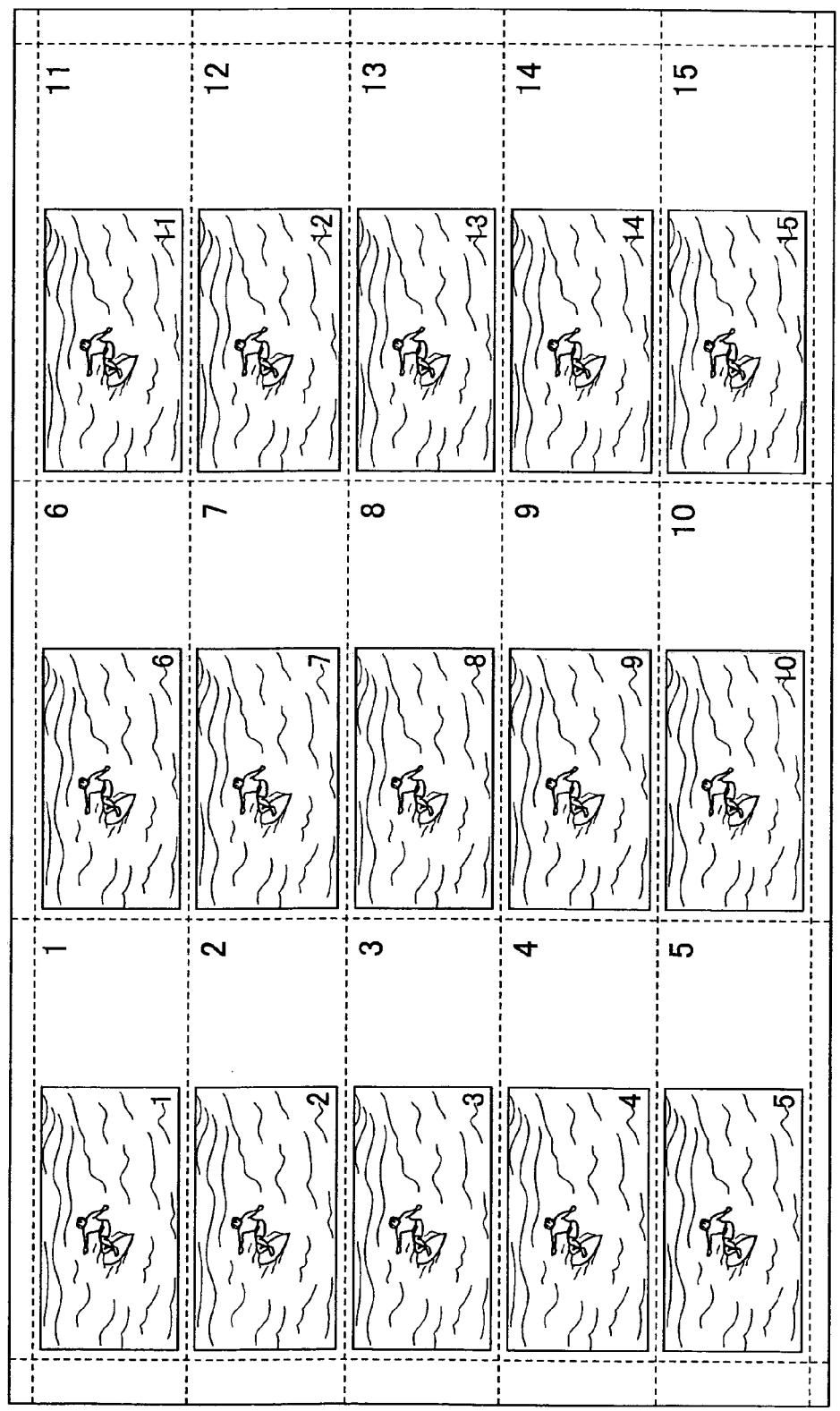
FIG. 10B is a diagram showing a printing-out example.
Figure 15:
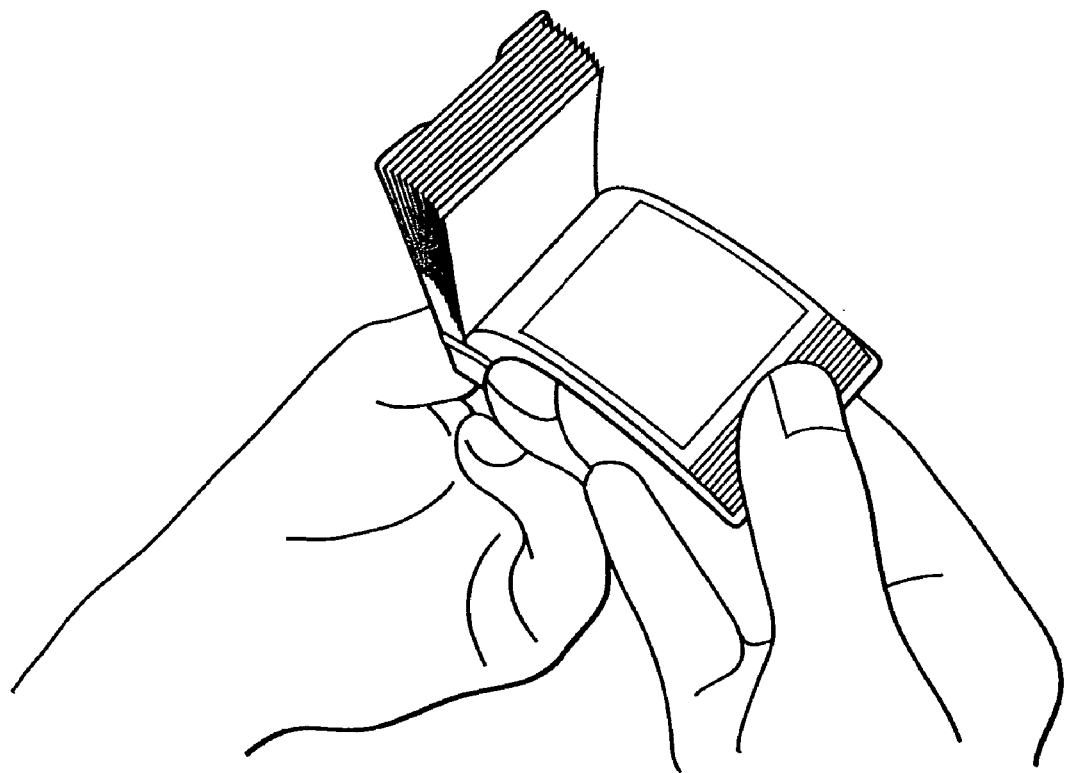
FIG. 15 is a diagram for explaining a state in which a turning moving-image is observed.

Next, a description is given of printing processing application operable as the application 111 according to the embodiment. The printing processing application according to the embodiment extracts a predetermined number of continuous still images from a desired range of the moving image data, and prints the continuous still images onto a perforated sheet which can be cut out like oblong cards, as shown in FIG. 10B. By printing the continuous still images and margins in the longitudinal direction of the sheets like the oblong cards in parallel therewith, the sheets like the oblong cards have gutters. The thus-obtained sheets like the oblong cards are bound and the turning moving-images are observed by handling the sheets like the oblong cards as shown in FIG. 15. A detailed description is given of the operation and functions of the printing processing application according to the embodiment.

Figure 7:
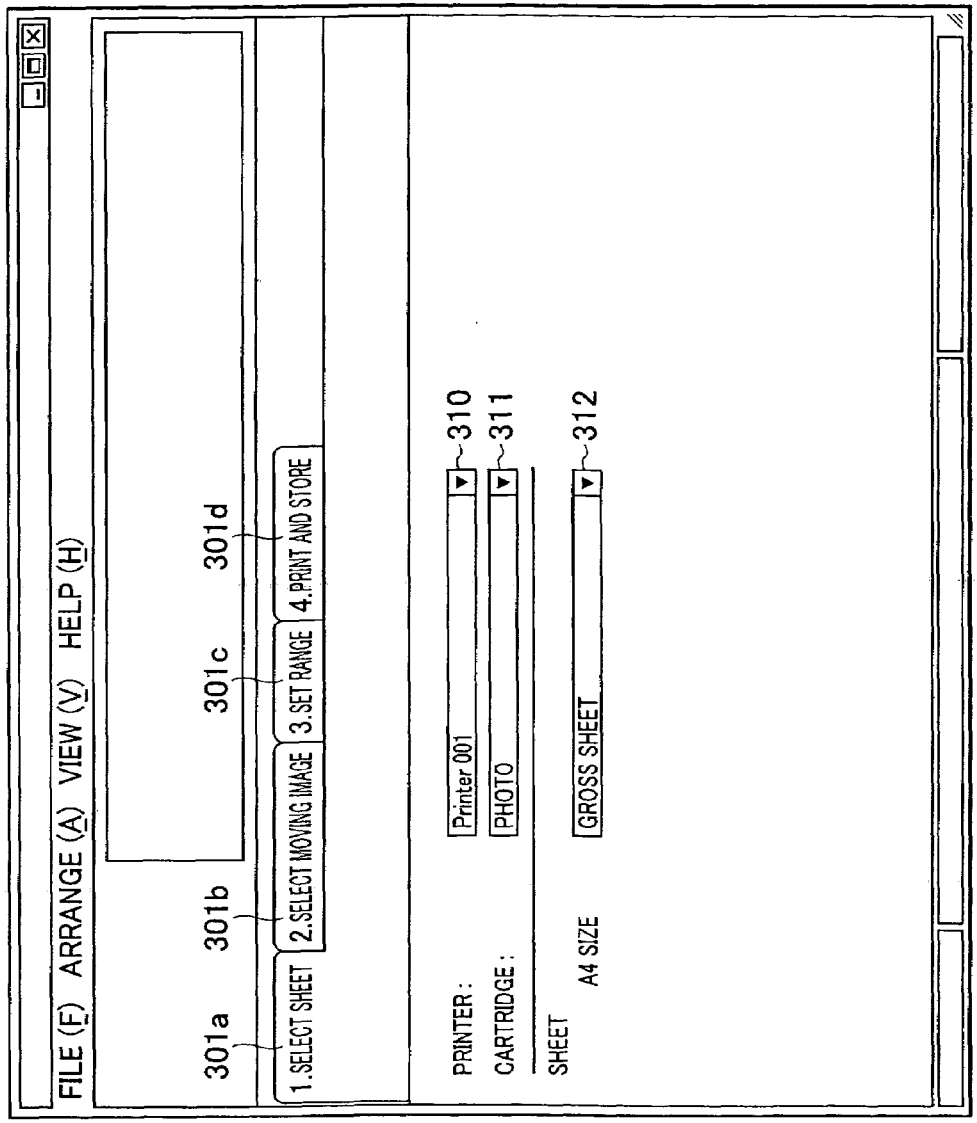
FIG. 7 is a diagram showing a display example of a sheet selecting screen.

The printing processing application according to the embodiment is started and, then, a dedicated application window is displayed. The application window includes a sheet selecting screen (refer to FIG. 7), a moving image selecting screen (refer to FIG. 8), a range setting screen (refer to FIGS. 9A and 9B), and a printing and storing screen (refer to FIG. 10A). When the printing application is started, the sheet selecting window is displayed as an initial screen. However, the present invention is not limited to this. The screens have tabs 301a to 301d for selecting the screen, and shift to the desired screen among the screens shown in FIGS. 7 to 10A by clicking the desired tab.

A schematic printing sequence according to the printing processing application is as follows.

(1) First, a used printer or sheet is set on the sheet selecting screen.

(2) A desired moving image file is selected on the moving image selecting screen.

(3) A desired range of the moving image file selected on the moving image selecting screen is set on the range setting screen. It is confirmed whether or not the range set by the preview of the turning moving-image is proper.

(4) A predetermined number of continuous still images are generated, on the printing and storing screen, from the desired range set on the range setting screen, and the generated continuous still images are outputted by the set printer.

Hereinbelow, the operations are described in detail on the screens.

Figure 3:
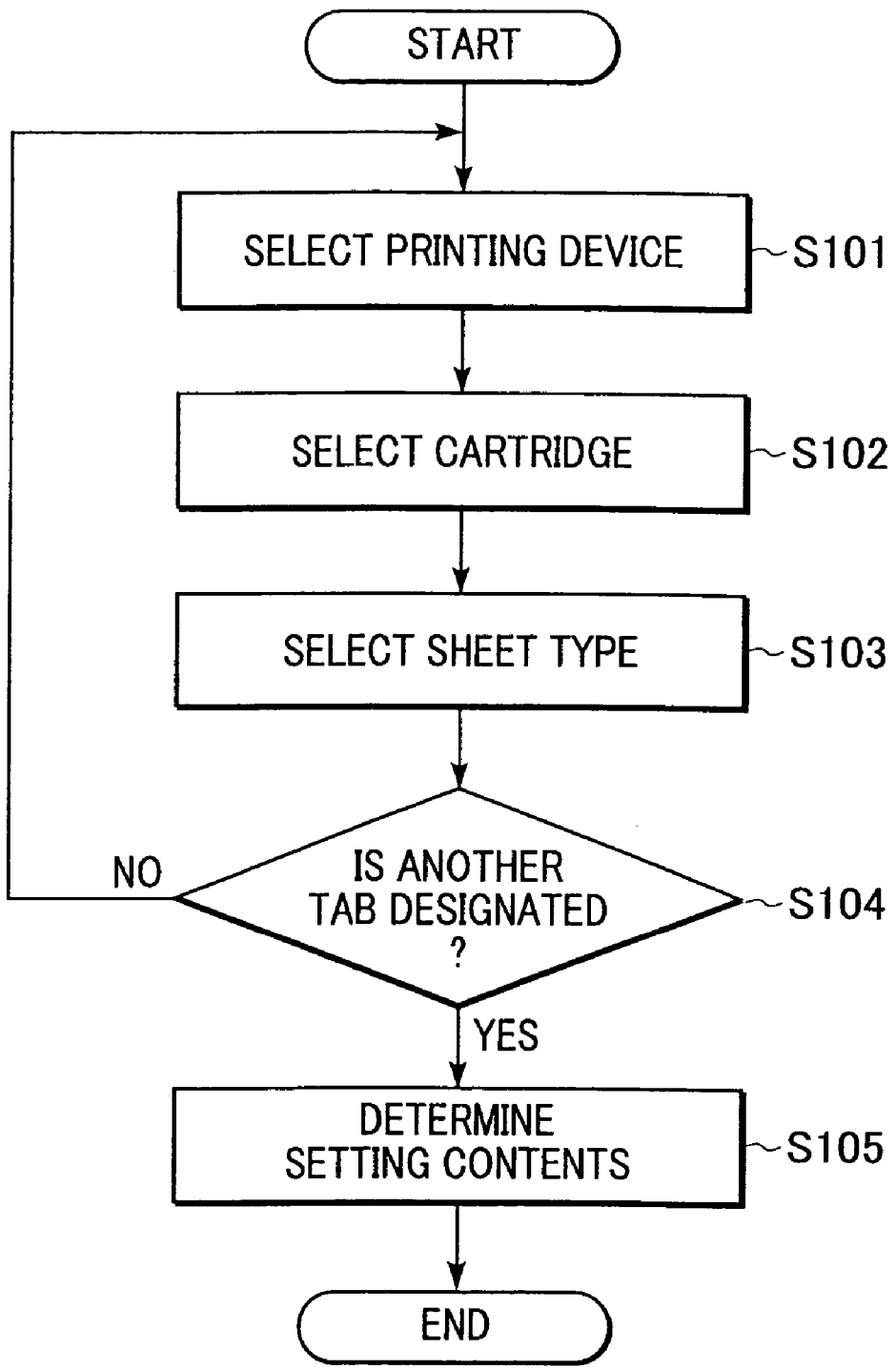
FIG. 3 is a flowchart for explaining processing executed when a sheet selecting screen is selected.

First, a description is given of the sheet selecting processing which is executed on the displayed sheet selecting screen with reference to FIGS. 3 to 7. FIG. 3 is a flowchart for explaining the processing executed when the sheet selecting screen is selected.

In step S101, a selected printer name is inputted to a box 310, and the printer selection is promoted to the user. An available printer list is displayed by clicking a "∇ portion" on the left of the box 310. The user can select the desired printer from the printer list. When only a single available printer exists, the printer is displayed on the box 310. Incidentally, the available printer means is a printer corresponding to the printing application while the printer driver 112 is installed to the information processing device 100. Upon starting the printing application, it is assumed that the selected printer is one selected at the previous end timing.

In step S102, a cartridge is selected by using a box 311. In step S103, the sheet is selected by using a box 312. According to the embodiment, the sheet size is fixed to A4 one. However, a desired sheet size may be selected.

In step S104, it is determined whether or not any of the tabs (301b to 301d) for shifting to another screen is selected. If NO in step S104, the processing sequence returns to step S101. If YES in step S104, the processing sequence advances to step S105 whereupon the setting contents on the boxes 310 to 312 at this timing are determined as the setting contents. Obviously, the setting contents can be changed by selecting the tab 301a from another screen later and by displaying the sheet selecting screen.

Figure 4:
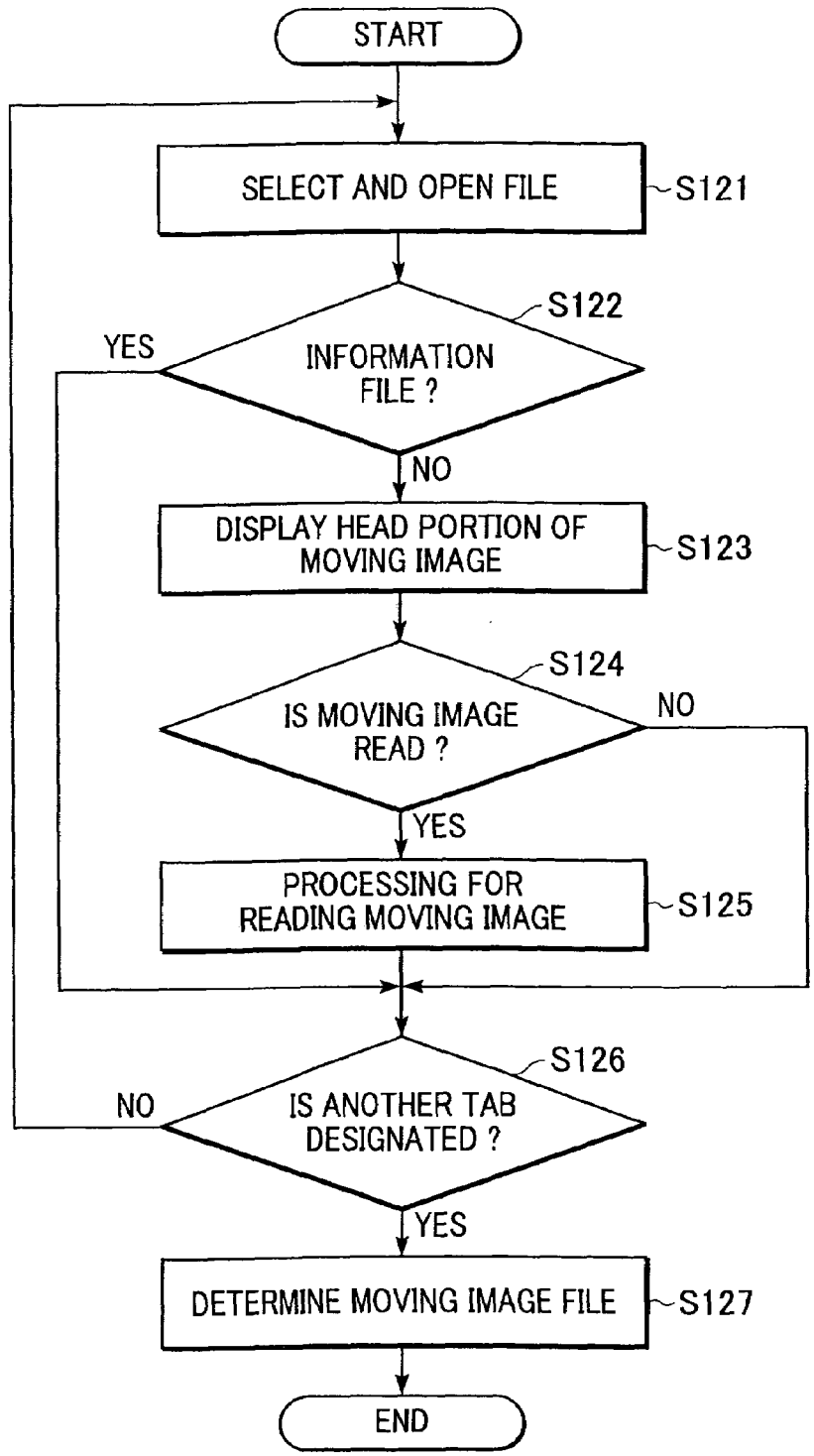
FIG. 4 is a flowchart for explaining processing executed when a moving image selecting screen is selected.
Figure 8:
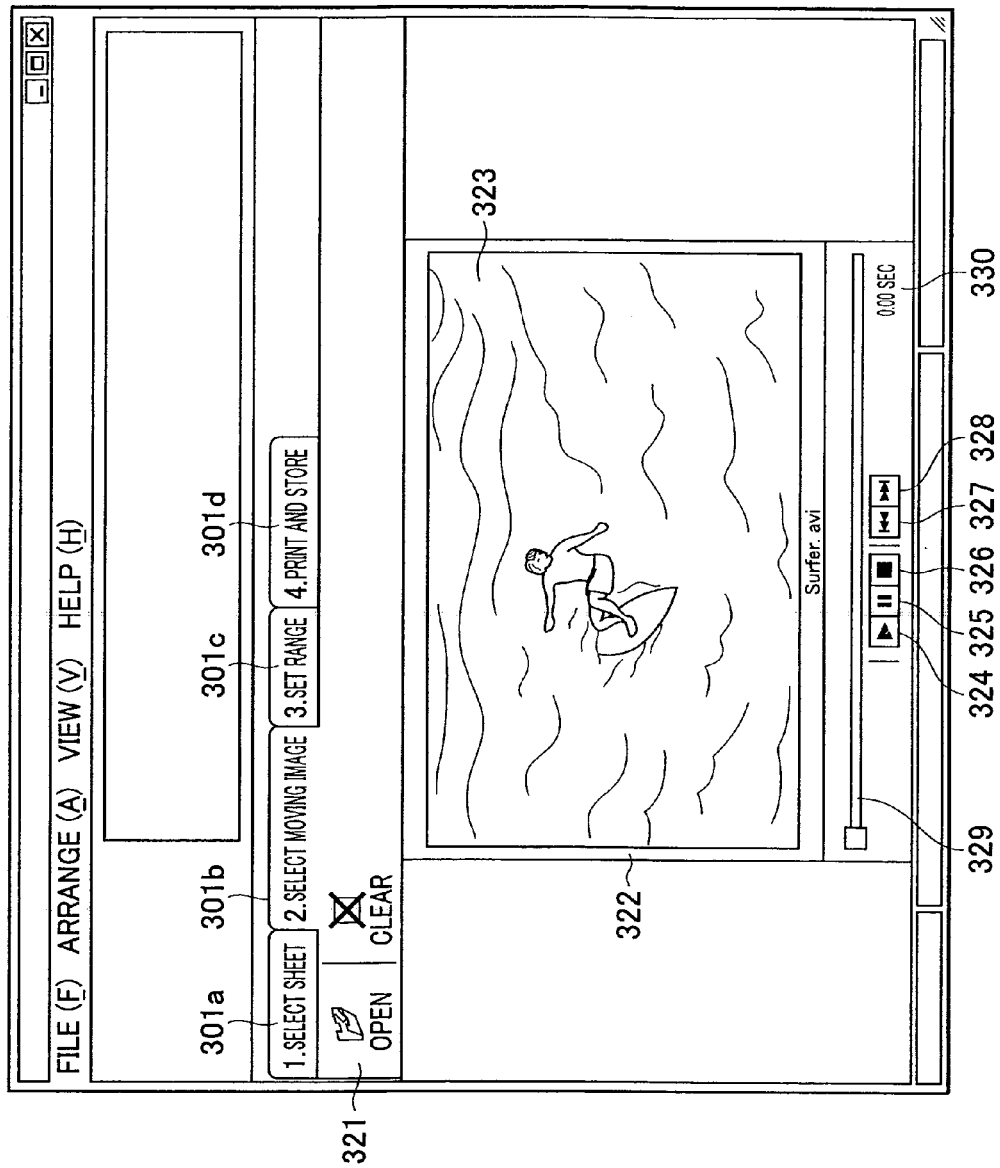
FIG. 8 is a diagram showing a display example of a moving image selecting screen.

Next, a description is given of processing for selecting the moving image which is executed upon selecting the tab 301b and for shifting to the moving image selecting screen with reference to FIGS. 4 and 8. FIG. 4 is a flowchart for explaining the processing which is executed when the moving image selecting screen shown in FIG. 8 is selected.

In step S121, the selected file is opened by user's file opening operation. Here, a pop-up window (not shown) for selecting the file is displayed in accordance with the click operation of an "open" button 321 and the user selects the desired moving image file by using the pop-up window.

In step S122, it is determined whether or not the moving image file designated in step S121 is formed and is stored on the printing processing application. The printing processing application stores information for printing the continuous still images in step S169 in "printing and storing" processing shown in FIG. 6, as will be described later. If it is determined in step S122 that the information file is selected, moving image reading processing, which will be described later, is not performed and then the processing sequence shifts to step S126. The determination in step S122 is performed by referring to file extensions.

As will be described later, the information file stores an image file name and a range for cutting out the still image (moving image frame range and trimming area). According to the embodiment, the screen is automatically switched to the printing and storing screen so as to promptly execute the printing operation upon opening the information file. That is, upon opening the information file on the moving image selecting screen, the processing sequence skips a step of reading the moving image and jumps to the printing and storing screen (jumping processing is not shown on the flowchart). When the above structure is not used and the information file is selected, the moving image may be read similarly to the case of normally selecting the moving image file.

When the file selected in step S121 is the moving image file which can be processed by the printing application, the processing sequence advances to step S123 whereupon the image at the head frame of the moving image file is displayed on a moving image reading area 323 in the moving image reading window 322.

The moving image reading window 322 comprises user interfaces having a reading button 324 for instructing the start of reading processing of the selected moving file, a temporary stop button 325 for instructing the temporary stop and the cancel thereof in the reading processing, a stop button 326 for stopping the reading processing, a moving button 327 for movement to the head of the moving image, a moving button 328 for movement to the last moving image file, and a seek bar 329. The display portion Is moved to an arbitrary position in the moving image file by dragging the seek bar 329. During reading the moving image, the seek bar 329 is moved in accordance with the reading position. Time indication 330 indicates the position which is currently read by time from the start of reading.

When the reading operation of the moving image is instructed by operating the reading button 324, the processing sequence advances to step S125 from step S124. In step S125, the moving image file selected in step S121 is read. A detailed description and flowcharts are not given of the operating processing of another operation button, and contents thereof will apparently be understood by those in the art.

Figure 5A:
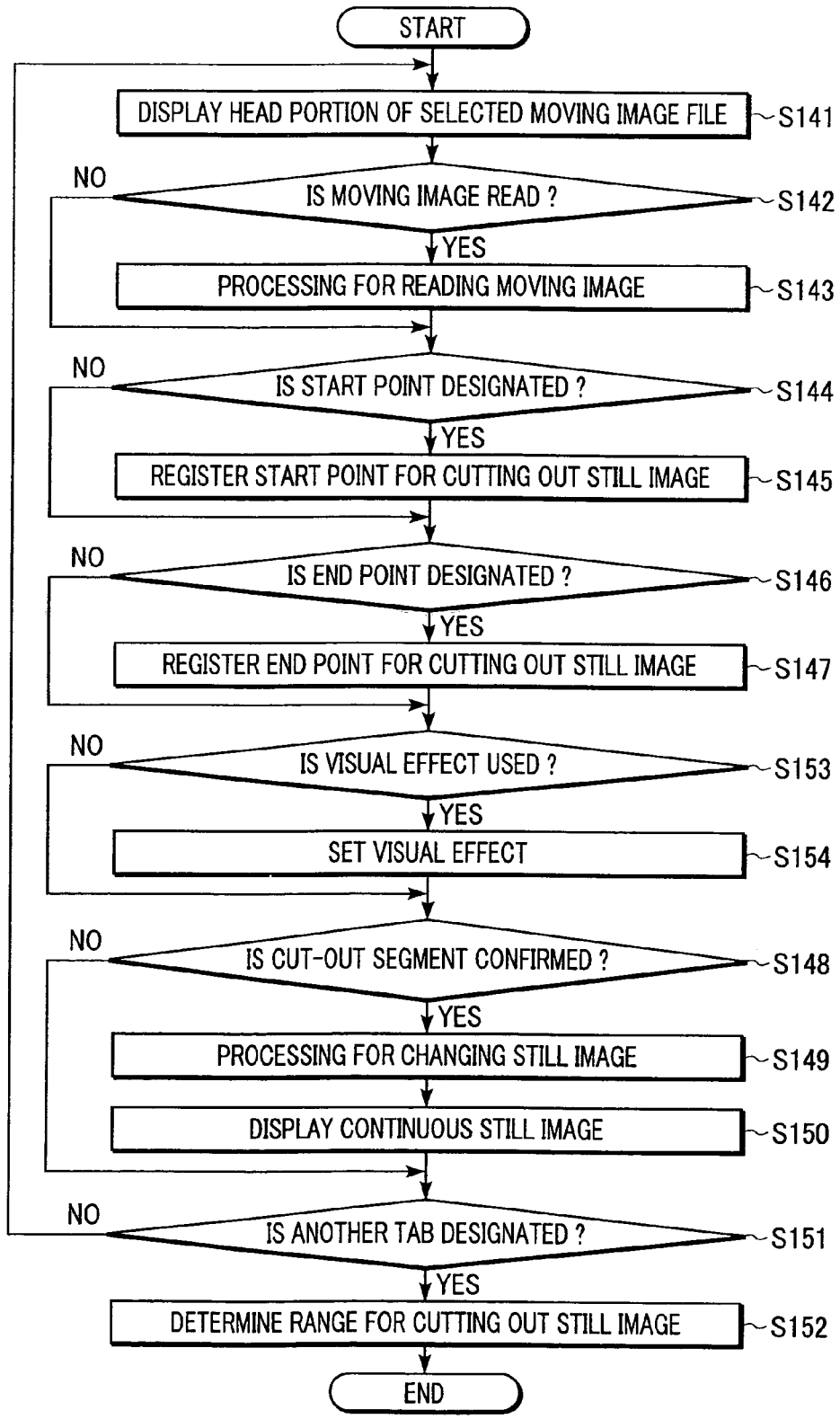
FIG. 5A is a flowchart for explaining processing when a range setting screen is selected.
Figure 9A:
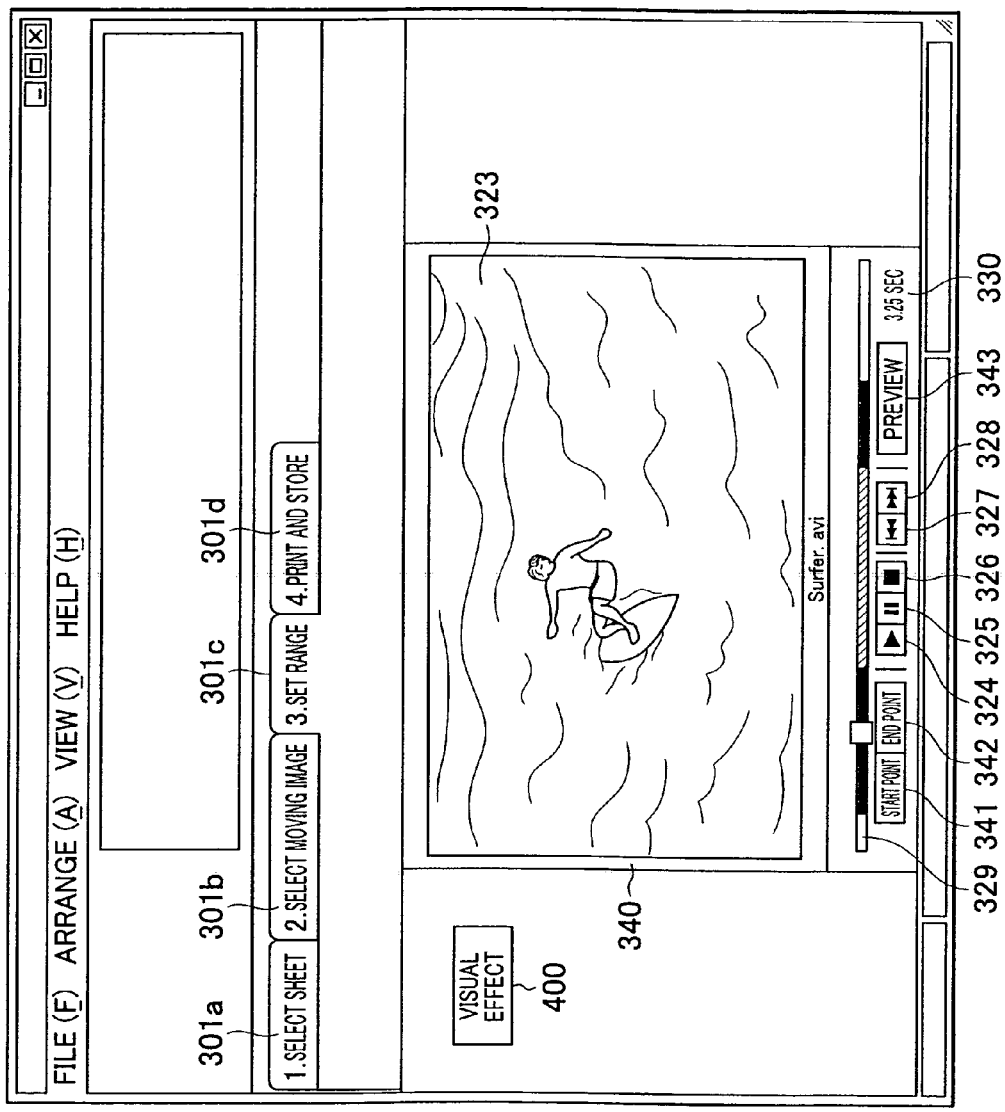
FIG. 9A is a diagram showing one display example of a range setting screen.

Upon selecting any of the tabs 301a, 301c, and 301d for shifting to another screen while the moving image file is selected, the moving image file designated by the moving image file or the information file is determined as the moving image file, the processing ends, and the screen shifts to the designated screen (steps S126 and S127). Upon selecting no tabs, steps S121 to S125 are repeated. Obviously, the determined contents can be changed by selecting the tab 301b from another screen later and by displaying the moving image selecting screen. Next, a description is given of the range setting processing which is executed upon selecting the tab 301c and shifting to the range setting screen with reference to FIGS. 5A, 5B, and 9A and 9B. FIG. 5A is a flowchart for explaining the processing which is executed when the range setting screen shown in FIG. 9A is selected. A desired range (referred to as a range for cutting out the still image) is set from the moving image file as a target of the continuous still images.

Referring to FIG. 9A, the range setting screen displays the moving image reading window 340 including the moving image area 323 for reading the selected moving image file, the various operation buttons 324 to 328, and the seek bar 329. The moving image reading window 340 on the range setting screen includes a start point button 341 and an end point button 342 for setting the range for cutting out the desired still image from the moving image, and a preview button 343 for previewing, as the turning moving-image, the continuous still images obtained from the setting range for cutting out the still image.

The moving image reading processing in steps S141 to S143 is the same as that in steps S123 to S125. That is, the image of the head frame in the moving image file selected on the moving image selecting screen is displayed on the moving image reading area (step S141). The reading button 324 is clicked (step S142). Thus, the moving image file starts to be read (step S143).

When the start point button 341 is clicked during reading the moving image file, the reading time is registered as the start point of the range for cutting out the still image (steps S144 and S145). When the end point button 342 is clicked, the reading time thereof is registered as the end point of the range for cutting out the still image (steps S146 and S147). When the start point and the end point are registered, referring to FIG. 8, the selecting range can be identified by changing a display color of a portion corresponding to the selecting range of the seek bar 329 so as to indicate the selecting range for cutting out the still image.

The desired range of the moving image is determined by designating the start point and end point during reading the moving image file. However, the present invention is not limited to this. The start point of the range for cutting out the still image may be designated by moving the seek bar 329 to the desired reading position and by clicking the start point button 341. Similarly, the end point of the range for cutting out the still image may be designated by clicking the end point button 342. In this case, the moving image file does not need to be read by the reading button 324. However, the frame image corresponding to the position designated by the seek bar 329 must be displayed at the moving image reading area 323.

The range of the still image may be cut out by combining a method for designating the range for cutting out the still image during reading the moving image and a method for designating the range for cutting out the still image by using the seek bar 329. The operation of the seek bar 329 enables the movement to the desired position in the moving image data, and the start point in the range for cutting out the still image is designated by clicking the start point button 341. After that, the moving image is read from the start point thereof by clicking the reading button 324 and the range for cutting out the still image is set by clicking the end point button 342 at the desired position.

According to the embodiment, the start point and the end point in the range for cutting out the still image are registered by the reading time. However, the present invention is not limited this and the start point and the end point may be registered by using a frame number, etc.

Figure 12:
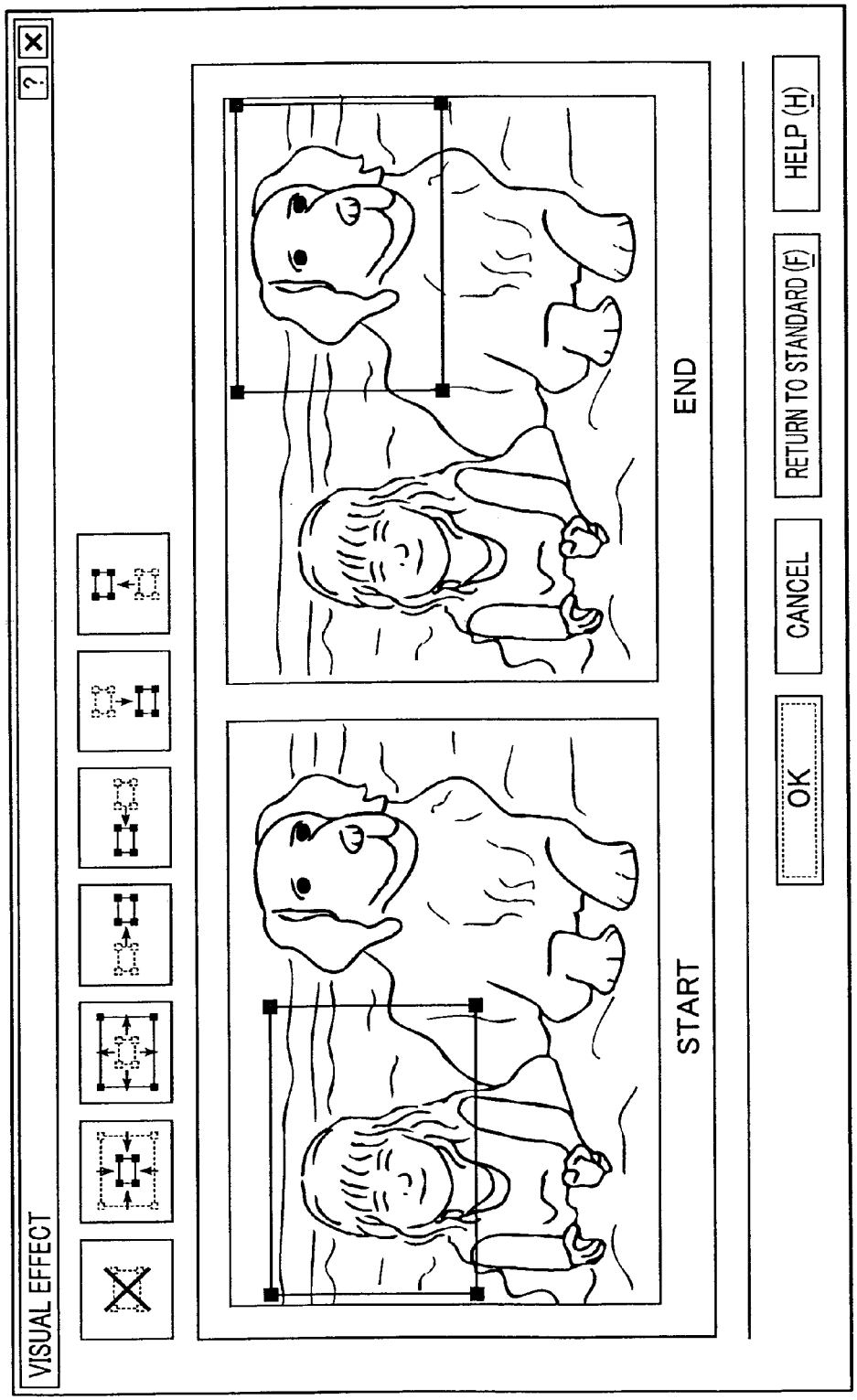
FIG. 12 is a diagram showing the setting of the trimming area when a camera pan effect is set.

After determining the start point and the end point of the moving image file, in step S153, visual effects such as camera zoom-in/zoom-out and camera pan are used. Upon setting the visual effect, the processing sequence advances to step S154 from step S153 by pressing a visual effect button 400 shown in FIG. 9A. In step S154, the user interface shown in FIGS. 11 and 12 is displayed. The setting of the visual effect is performed by using the user interface.

Referring to FIGS. 11 and 12, upon setting the visual effect according to the embodiment, interfaces for setting the trimming areas to a frame image (start image) corresponding to the start point registered in step S145 and to a frame image (end image) corresponding to the end point registered in step S147 are provided. The set trimming areas are enlarged or are reduced to the output size, and are printed, thereby obtaining the visual effect of the zoom-in/zoom/out or camera pan of the moving image with small movement.

Upon setting the trimming areas of the start image and the end image, the operability is improved so as to visualize which visual effect is obtained by a trimming method by providing guide buttons 501 to 507 on the top in FIGS. 11 and 12.

FIG. 11 is a diagram showing a setting example of the visual effect of the camera zoom-in. The pressing operation of the guide button 502 at the second position from the left sets defaults on the entire trimming area of the start image and in the center of the trimming area of the end image. In this case, when the trimming area on the end screen does not match the subject for the zoom-in, the position and the size can manually be adjusted.

Figure 13A:
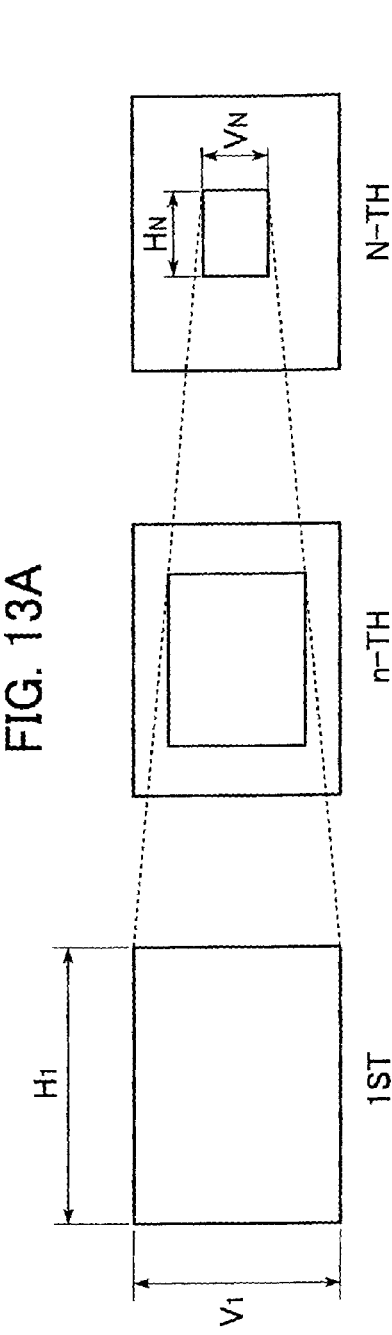
FIG. 13 is a diagram for explaining the movement and the size change of the trimming area.

In the setting, the proportional trimming area of the frames from the start screen to the end screen is calculated and the still image is cut out. Referring to FIG. 13A, when the trimming area of the start screen (first image) corresponds to the entire screen ($H_1 \times V_1$) and the trimming area of the end screen (N-th image) corresponds to ($H_N \times V_N$), the vertical size and the horizontal size of the trimming area are changed by ($V_1-V_N$)/N and ($H_1-H_N$)/N (where symbol N denotes the number of continuous still images), respectively. As a result, the "turning moving-image", e.g., a zoom-in image of a dog is enjoyed.

When the position of the trimming area on the end screen is moved, the center position of the trimming area is deviated from the screen center. Therefore, the center position of the trimming area on the still image may be determined by equally dividing the amount of deviation by the number N of the continuous still images. The shift of the center position of the trimming area will be described later with reference to FIG. 13B.

The guide button 503 at the third position from the left is a button for setting the default of the zoom-out. By pressing the guide button 503, the defaults are set to the trimming area in the center of the start screen and to the trimming area on the entire end screen. In the setting, the still images are cut out and, then, the "turning moving-image", e.g., a zoom-out image of the dog is enjoyed.

FIG. 12 is a diagram showing a setting example of the visual effect of the camera pan. The defaults are set to the trimming area on the left of the start screen and to the trimming area on the right of the end screen, by pressing the guide button 504 at the fourth position from the left. In this case, when the trimming areas on the start screen and the end screen do not match the target subject, the position and the size can manually be adjusted.

Figure 13B:
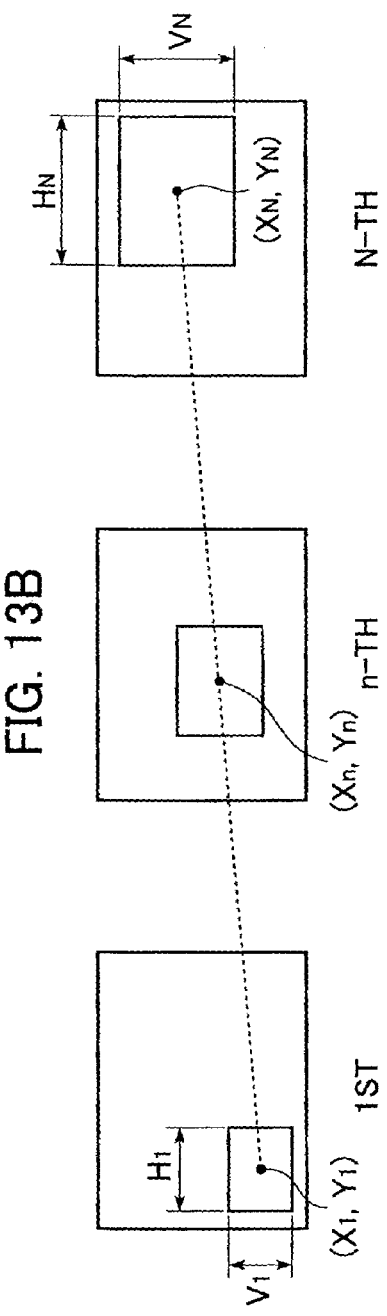

In the setting, the proportional trimming position and size are calculated in the frames from the start screen to the end screen. Referring to FIG. 13B, when it is assumed that the center position of the trimming area on the start screen is designated by ($X_1, Y_1$) and the center position of the trimming area on the end screen is designated by ($X_N, Y_N$), a center position ($X_n, Y_n$) of the trimming area of an n-th still image is expressed by ($X_1+n\times(X_N-X_1)/N$, $Y_1+n\times(Y_N-Y_1)/N$). When the size is further changed, it may be changed by the above method shown in FIG. 13A. For example, when the trimming area on the start screen is ($H_1 \times V_1$) and the trimming area on the end screen is ($H_N \times V_N$), the trimming area of the n-th still image is set in the vertical direction and in the horizontal direction with size of ($H_1+n\times(H_N-H_1)/N$, $V_1+n\times(V_N-V_1)/N$). In the above setting of the trimming areas, the still images are cut out and, thus, the "turning moving-image", e.g., a camera-pan image from a girl on the left to a dog face on the right is enjoyed.

The guide button 505 at the fifth position from the left is a button for setting the default of the camera pan from the right to the left. By pressing the guide button 505, the defaults are set to the trimming area on the right of the start screen and to the trimming area on the left of the end screen. In the setting, the still images are cut out and, thus, the "turning moving-image", e.g., a camera-pan image from the right to the left is enjoyed.

The guide button 506 at the sixth position from the left is a button for setting the default of the camera pan from the top to the bottom. By pressing the guide button 506, the defaults are set to the trimming area on the top on the start screen and to the trimming area on the bottom of the end screen. In the setting, the still images are cut out and, thus, the "turn moving image", e.g., an image of the camera pan from the top to the bottom is enjoyed.

The guide button 507 at the seventh position from the left is a button for setting the default of the camera pan from the bottom to the top. By pressing the guide button 507, the defaults are set to the trimming area on the bottom of the start screen and to the trimming area on the top of the end screen. In the setting, the still images are cut out and, thus, the "turning moving-image", e.g., an image of the camera pan from the bottom to the top is enjoyed.

The leftmost guide button 501 is pressed, thereby returning the trimming areas on the start screen and the end screen to the entire screen.

Figure 14A:
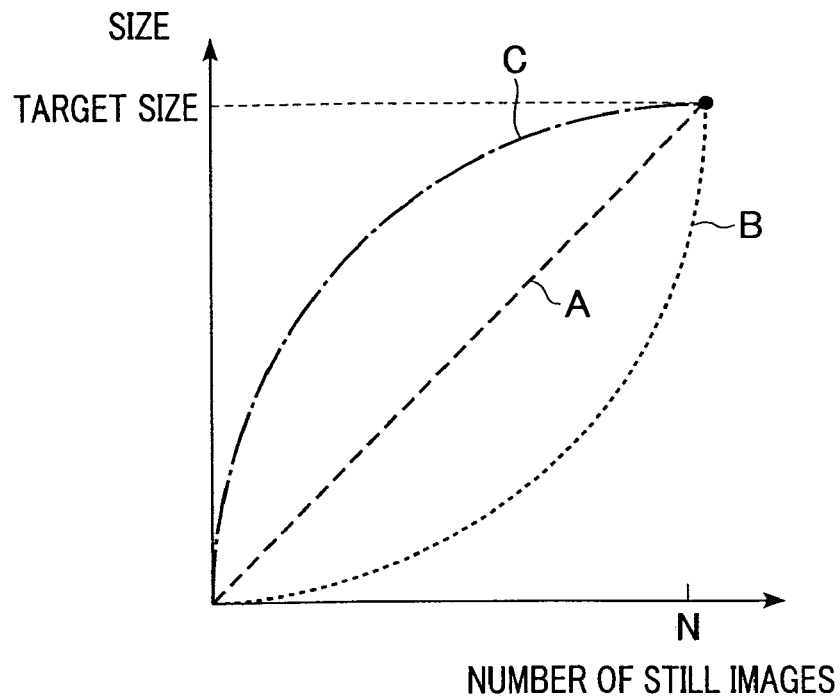
FIG. 14 is a diagram for explaining the setting of a form for changing the size of the trimming area and a form for changing the position thereof.
Figure 14B:
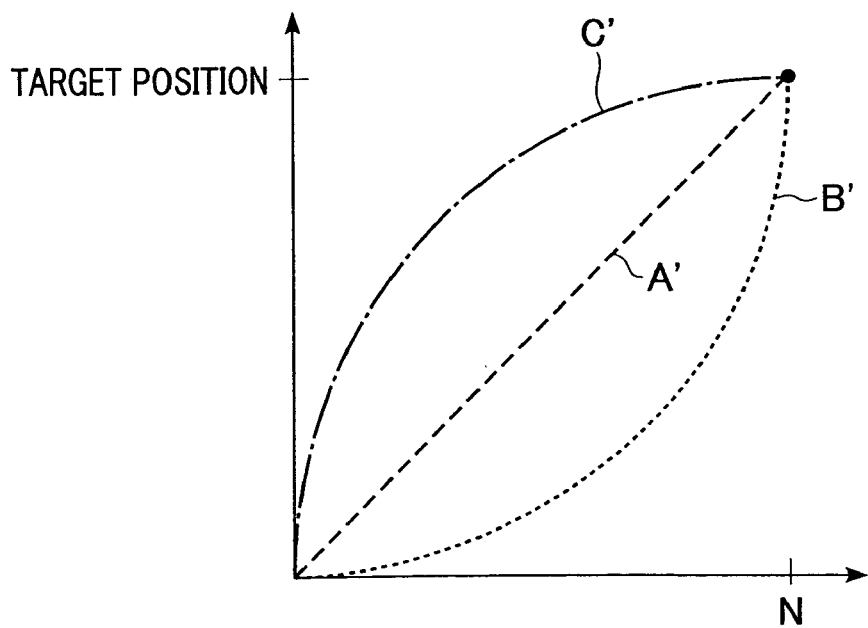

According to the embodiment, when the two trimming areas are set on the start screen and on the end screen of the continuous still images and the positions and/or sizes of the two trimming areas are different from each other, they are linearly changed. However, the present invention is not limited to this. For example, the turning moving-image may largely be changed on the start side and it may not be changed so largely on the end side. Alternatively, the turning moving-image may largely be changed on the end side and it may not be changed so largely on the start side. That is, referring to FIG. 14A, the image may linearly be changed as shown by a straight line A from the size in the trimming area designated by the first still image to the size in the trimming area designated by the N-th still image. Alternatively, the change speed of the size may be changed as shown by a curve B and a curve C. For example, in the case of setting the curve B, the end portion of the turning moving-image is acceleratively zoomed. Referring to FIG. 14B, similarly, the size may be set as shown by a straight line A' or it may be set as shown by a curve B' or C'. For example, in the setting of the curve C', the position of the trimming area is changed at a high speed in a start portion of the turning moving-image and it is changed at a low speed in an end portion thereof.

For the change of the changing speed of the size and of that of the position, an interface for selecting any of the straight line A and the curves B and C every size and every changing speed may be provided. Alternatively, the user may desirably set a curve. Obviously, those in the art will understand the above interface.

In the foregoing, the trimming areas are set to the start screen and the end screen. However, an arbitrary position may be set in the continuous still images. For example, the trimming area can be set by using a tenth still image and a thirtieth still image. In this case, the first trimming area (trimming area set to the tenth still image) is set on the screens (e.g., first to ninth still images) in front of the screen to which the first trimming area is set. The last trimming area (trimming area set to the thirtieth still image) is set to the screens (thirty-first to forty-fifth still images) at the back of the screen to which the last trimming area is set.

Further, a description is given of the setting of the above visual effect with reference to a flowchart shown in FIG. 5B. In step S201, it is selected which visual effect is used. If the guide button 502 is selected, the visual effect is the zoom-in and the processing sequence shifts to step S204 to step S205. In step S205, referring to FIG. 11, the defaults are set to the trimming area of the entire start screen and to the trimming area in the center of the end screen. In this case, when the trimming area on the end screen does not match the subject for the zoom-in, the position and the size are manually adjusted.

Upon selecting the guide button 503, the zoom-out is obtained as the visual effect and the processing sequence shifts to step S207 from step S206. In step S207, the defaults are set to the trimming area in the center of the start screen and to the trimming area of the entire end screen. In this case, when the trimming area on the start screen does not match the subject for the zoom-in, the position and the size are manually adjusted.

Upon selecting the guide button 504, the camera pan from the left to the right is obtained as the visual effect and the processing sequence shifts to step S209 from step S208. In step S209, the defaults are set to the trimming area on the left of the start screen and to the trimming area on the right of the end screen. Referring to FIG. 12, the trimming areas are set.

Upon selecting the guide button 505, the camera pan from the right to the left is obtained as the visual effect and the processing sequence shifts to step S211 from step S210. In step S211, the defaults are set to the trimming area on the right of the start screen and to the trimming area on the left of the end screen.

Upon selecting the guide button 506, the camera pan (tilt) from the top to the bottom is obtained as the visual effect and the processing sequence shifts to step S213 from step S212. In step S213, the defaults are set to the trimming area on the top of the start screen and to the trimming area on the bottom of the end screen. Thus, an interface similar to that shown in FIG. 11 or 12 indicates the screen.

Upon selecting the guide button 507, the camera pan from the bottom to the top is obtained as the visual effect and the processing sequence shifts to step S215 from step S214. In step S215, the defaults are set to the trimming area on the bottom of the start screen and to the trimming area on the top of the end screen. Thus, an interface similar to that shown in FIG. 11 or 12 indicates the screen.

Upon selecting the guide button 501, the processing sequence shifts to step S203 from step S202. In step S203, the trimming areas are set to the entire start image and the entire end image and the processing sequence return to the initial state.

After setting the trimming areas, as mentioned above with reference to FIGS. 13A and 13B, the trimming areas of N frames are determined (step S216).

On the printing processing application according to the embodiment, a predetermined number of continuous still images (assumed that 45 continuous still images according to the embodiment) are cut out from the range for outputting the still image as set above and the cut-out still images are printed out. The thus-obtained printed-out continuous still images are detached like the oblong cards and are observed as the turning moving-image by continuously turning the still images. To accomplish the foregoing, preferably, the continuous still images are previewed so as to observe the pseudo turning moving-image. Hereinbelow, a preview function for realizing the foregoing is realized in steps S148 to S150.

After setting the range for cutting out the still image by the start point and the end point as mentioned above, a preview button 343 is clicked and thus the processing sequence advances to step S149 from step S148 (incidentally, only when the range for cutting out the still image is set, the processing sequence advances to step S149).

In step S149, the predetermined number of continuous still images is generated and is obtained from the setting range for cutting out the still image. In this case, the continuous still images are generated so that they are adjacent thereto at the same time interval (corresponding to the same number of frames). That is, the frames are extracted from the setting range for cutting out the still images at the same interval and the continuous still images are generated from the extracted frames.

The frames are extracted in step S149 by using the following expression.

$$m=1+INT((n-1)\times(M-1)/(N-1)+0.5)$$

Here, reference numeral INT(x) denotes a function for obtaining numbers by omitting the figures after the decimal fractions,
where M: number of frames in the selecting range,
N: number of extracted frames (N>1, N is fixed to 45 according to the embodiment),
n: frame ordering number (1 to N), and
m: extracted frame number (1 to M)
(reference numerals M, N, n, and m denote all integers).

In the following expression, when $M=(N-1)\times y+1$ (y is an integer which is not less than 1, all the intervals of the frames are equal.

The trimming areas determined in step S216 are obtained from the frames extracted as mentioned above. The size of the obtained trimming area is changed to the predetermined frame size.

In step S150, the continuous still images generated in step S149 are sequentially displayed in the image pick-up order so that 45 continuous still images end to be displayed for 2 sec. In this case, an interval for switching from one still image to another still image is set to be constant (e.g., 2/45 sec when the 45 continuous still images are displayed for 2 sec).

When the preview button 343 is clicked without changing the selecting range of the moving image, the continuous still images have already been generated. Thus, the processing in step S149 is omitted.

When this state is maintained and the tabs 301a, 301b, and 301d corresponding to other operating screens are clicked, the processing sequence advances to step S152 from step S151. In step S152, the setting range for cutting out the still image is determined. Of course, the determined contents can be changed by selecting the tab 301c from another screen and by displaying the range setting screen. When the tab corresponding to another operating screen is not clicked, the above processing is repeated. Consequently, the processing sequence returns to step S141. According to the embodiment, since the preview contents are displayed and the range is set on the single screen (range setting screen), the turning moving-image is confirmed by the preview and then the range is set again, thereby improving the operability.

As mentioned above, the visual effects such as the camera pan, the tilt operation, and the zoom operation are confirmed.

On the preview display of the continuous still images in step S150, the display time may arbitrarily be set by providing a preview setting panel 344 as shown in FIG. 9B. For example, as shown by a portion 345 in FIG. 9B, the entire display time can arbitrarily be set and the setting is performed so that the image is displayed for one sec. Then, the continuous still images are switched and are displayed at a time interval of 1/45 sec. Further, as shown by a portion 346 in FIG. 9B, the interval for switching the continuous still images may be designated (e.g., the continuous still images are switched at a time interval of 0.04 sec).

As shown by a portion 347 in FIG. 9B, the manual operation may be possible. In the example, a slide bar 348 is displayed and a knob 349 is slid by a mouse. Then, in accordance with the above operation, the continuous still images are switched and are displayed. With the structure, the switching interval which is constant and fixed in the continuous display operation can be changed in the above-mentioned portions 345 and 346. The accurate preview can be displayed by the user's turning operation.

Figure 6:
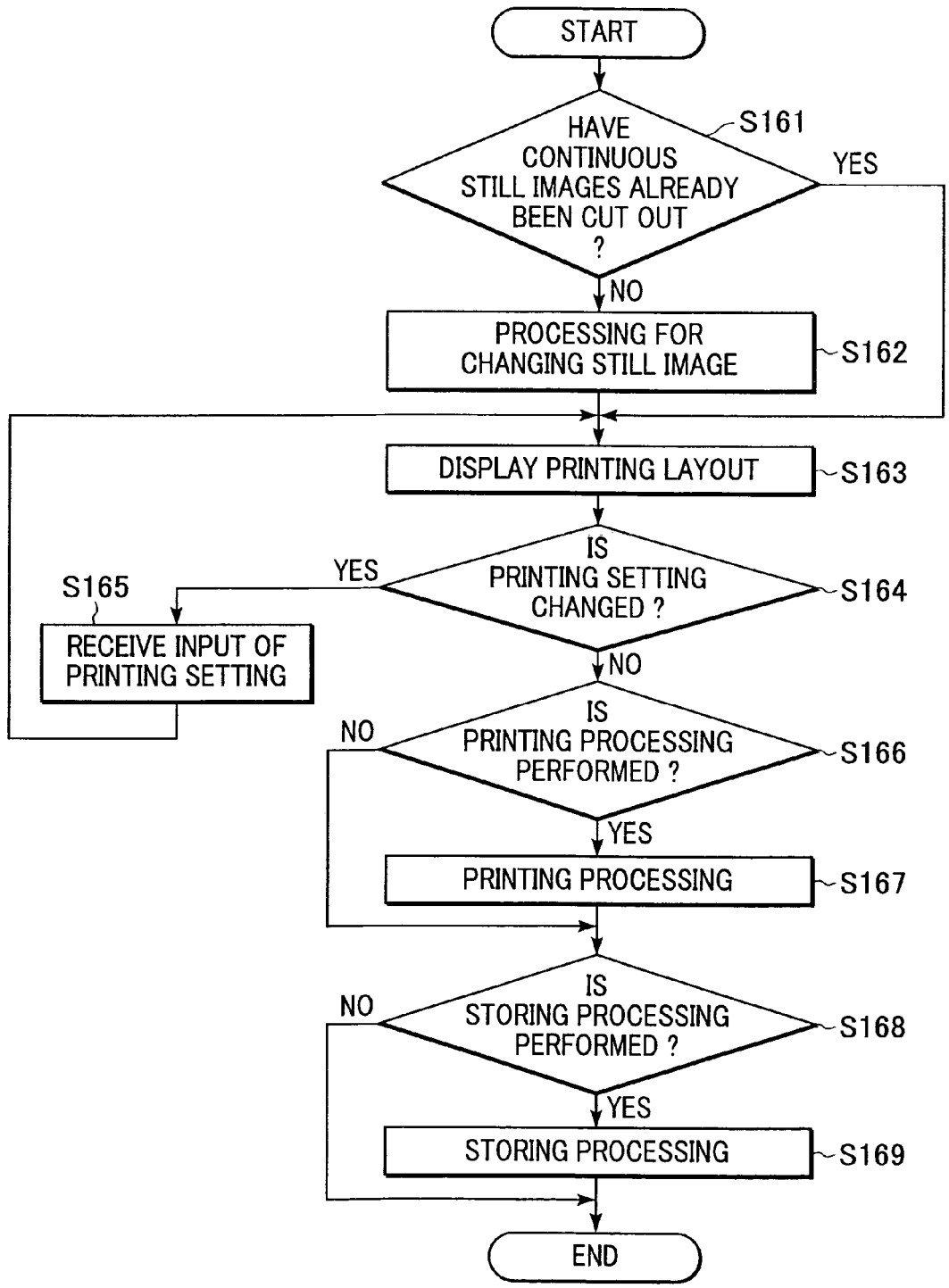
FIG. 6 is a flowchart for explaining processing executed when a printing and storing screen is selected.

Next, a description is given of processing when the tab 301a is selected and the screen shifts to the printing and storing screen. FIG. 6 is a flowchart for explaining the processing which is executed when the printing and storing screen shown in FIG. 10A is selected. On the printing and storing screen, it is possible to print the continuous still images obtained from the range for cutting out the still image set on the range setting screen and to store the cut-out information.

In step S161, it is determined whether or not the processing for converting the still image of the currently-set cutting-out target in step S149 is performed. If YES in step S161, the continuous still images of the range for cutting out the still image are obtained and thus the processing sequence skips step S162. If NO in step S161, the processing sequence advances to step S162 whereupon a predetermined number of continuous still images are cut out from the range for cutting out the still image which is set on the range setting screen. The processing in step S162 is the same as that in step S149 in FIG. 5.

In step S163, a printing layout 351 of the generated continuous still images is displayed. According to the embodiment, 15 continuous still images are printed on each A4-size sheet and thus the total three pages are printed. Therefore, a next-page button 356 or a previous-page button 355 is provided and they are operated, thereby confirming the printing layout 351 of all pages. Incidentally, numbers described in the continuous still images shown in FIGS. 10A and 10B are conveniently designated because they indicate the continuous still images (that is, the images are not the same one).

The printing setting button 353 is clicked, then, it is determined that the printing setting is changed, and the processing sequence advances to step S165. In step S165, a screen for inputting the printing setting (not shown) is displayed and the following printing setting indexes are set.

<Layout>
Right bind: Print with left-handed layout.
Left bind: Print with right-handed layout.
("Left bind" in the case of a default)
<Background>
No: Print no data around the continuous still images.
Black gradation: Print black gradation changing from the continuous still images to the margin around the continuous still images.
Designated-color gradation: Print gradation of designated color changing from the continuous still images to the margin around the continuous still image.
("Black gradation" in the case of the default)
<Title>
No: Print no title.
Print title: Print an inputted character string as a title (it is possible to set whether the title is printed on only the first page or on all the pages).
("No" in the case of the default)
<Photographing date>
No: Print no photographing date.
Print date: Print the photographing date (it is possible to set whether the photographing date is printed on only the first page or on all the pages).
("No" in the case of the default)

After setting the printing, the processing sequence returns to step S163 whereupon the printing layout is displayed on the updated printing setting. The change of the printing setting is directly reflected to the display for the printing layout.

The printing button 352 is clicked and, then, the processing sequence advances to step S167 from step S166 whereupon the continuous still images are printed on the designated printer as shown in FIG. 10B. With respect to the printing image in this case, the continuous still images are cut out from the moving image and are obtained by extracting the trimming areas, and the aspect ratio of the continuous still images is fixed. In this case, the continuous still images have the fixed aspect ratio and the reduced size included in an area of (42 mm×34 mm). Then, the obtained continuous still image is printed. The printing quality is a default one of a designated medium. When the background has the designated index, the background is printed to satisfy the designated index. When it is designated that the photographing date or the title is printed, it is printed in accordance with the designation. In order to clearly indicate the order of the continuous still images, numbers are printed to the margin on the side of the continuous still images (at the position on the upper right corner in the case of the right bind or at the position on the upper left corner in the case of the left bind according to the embodiment) (in an example of the right bind shown in FIG. 10B in which page numbers are printed on the upper left corner).

A storing button 345 is clicked and, then, the processing sequence advances to step S169 from step S168. In step S169, one file is stored, including the indexes set on the sheet selecting screen, moving image selecting screen, range setting screen, and printing and storing screen (printing setting). For example, the storing index includes a used printer, information on the cartridge, sheet, moving-image file name, start position for cutting out the still image, end position for cutting out the still image, designation of the trimming area, and the contents for the printing setting (layout and background). However, the data on the continuous still images is not stored.

The 45 thus-obtained continuous still images are printed on the sheet having the perforation as shown in FIG. 10A. The continuous still images are detached to the sheets like the oblong cards along the perforation and are bound. The bound images are continuously turned as shown in FIG. 15 and, thus, the turning moving-image is observed.

As mentioned above, on the printing processing application according to the embodiment, it is possible to print out the continuous still images in the desired range of the moving image data which can be observed as the turning moving-image. The user's desired turning moving-image can easily be provided.

In particular, it is possible to provide the turning moving-image having the camera pan, the camera tilt operation, and the camera zoom-in/zoom-out operation as the visual effects in accordance with the user's desire by setting the trimming areas in the continuous still images. Consequently, the visual effects such as the camera zoom-in/zoom-out operation and the camera pan are obtained in the moving image with the small movement and, advantageously, the turning moving-image is enjoyed.

In the preview function using the preview button 343 on the range setting screen as shown in FIG. 9A, the continuous still images which are cut out from the designated range are continuously switched and displayed. Thus, conveniently, the user can confirm the observing state of the turning moving-image by binding the continuous still images and by continuously turning them. When the user does not desire the turning moving-image, the range for cutting out the still image is promptly designated again without switching the window and the operability is improved.

Further, when the switching interval of the still images can be set in the preview function, the preview operation is performed in accordance with the user's desired turning speed. In addition, with the structure for controlling the switching operation of the continuous still images synchronously with the movement of the knob 348 of the scroll bar 348, the interval of the display switching can be changed during displaying the continuous still images. Thus, the preview function is realized in accordance with the user's way upon observing the turning moving-image (e.g., the speeds at the turning start and the turning end are slower than those of other portions) and the turning moving-image is previewed with more accuracy.

[Other Embodiments]

The present invention can be applied to a system comprising a plurality of devices (for example, a host computer, an interface device, a reader, and a printer) or to an apparatus comprising a single device (for example, a copying machine or a facsimile machine).

Obviously, the objects of the present invention can be accomplished by supplying to the system or apparatus, a storage medium for storing software program code to implement the functions of the information processing apparatus and the image output device according to the embodiment, and by reading out and executing the program code which is stored in the storage medium by a computer (CPU or MPU) of the system or apparatus.

In this case, the program code itself which is read out from the storage medium implements the function of the foregoing embodiment and the storage medium which stores the program code constructs the present invention.

As for the storage medium to supply the program code, it is able to use a floppy disk, hard disk, optical disk, magneto-optical disk, CD-ROM, CD-R, magnetic tape, nonvolatile memory card, ROM, and the like.

Obviously, the functions of the aforementioned embodiment can be effected not only by executing the program code which is read out by the computer, but also by executing a part or all of the actual processing on the OS (Operating System) which operates on the computer based on the instruction of the program code.

According to the present invention, the continuous still images are generated by using the trimming areas to be extracted from the frames.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
a reading-out unit to read out continuous still images having a specific order from a recording medium;
a trimming area determination unit adapted to determine trimming areas of a first image and a second image from continuous still images read out by the reading-out unit;
a trimming area calculation unit adapted to calculate a trimming area based on positions and/or sizes of the trimming areas of the first image and the second image determined by the trimming area determination unit, with respect to each image of which its order is between the first image and the second image among the continuous still images, wherein a position and/or a size of the trimming area of each image of which its order is between the first image and the second image are different from the positions and/or sizes of the trimming areas of the first image and the second image determined by the trimming area determination unit, the trimming area of each image of which its order is between the first image and the second image being a part of an entire area in which each image is recorded; and a generating unit adapted to generate a visual effect by generating succeeding images by using images cut out with the trimming area determined by the trimming area determination unit and images cut out with the trimming area calculated by the trimming area calculation unit.

2. An image processing apparatus according to claim 1, further comprising an output control unit adapted to control output of the succeeding images generated by the generating unit.

3. An image processing apparatus according to claim 2, wherein the output control unit is adapted to control display of the succeeding images generated by the generating unit.

4. An image processing apparatus according to claim 2, wherein the output control unit is adapted to control print out of the succeeding images generated by the generating unit.

5. An image processing apparatus according to claim 4, further comprising a recording unit adapted to record the images output by the output control unit.

6. An image processing apparatus according to claim 4, wherein the trimming area calculation unit is adapted to calculate trimming areas of each of remaining continuous still images, the remaining continuous still images being other than the first image and the second image in which trimming areas have been determined by the trimming area determination unit, so as to gradually change from the trimming area of the first image to the trimming area of the second image.

7. An image processing apparatus according to claim 4, wherein the trimming area calculation unit is adapted to calculate a position and/or a size of trimming areas of each of remaining continuous still images, the remaining continuous still images being other than the first image and the second image in which trimming areas have been determined by the trimming area determination unit, so as to proportionally change from the trimming area of the first image to the trimming area of the second image.

8. An image processing apparatus according to claim 4, wherein the trimming area calculation unit is adapted to calculate a position and/or a size of trimming areas of each of remaining continuous still images, the remaining continuous still images being other than the first image and the second image in which trimming areas have been determined by the trimming area determination unit, so as to non-proportionally change from the trimming area of the first image to the trimming area of the second image.

9. An image processing apparatus according to claim 4, wherein the output control unit is adapted to switch and output the succeeding images generated by the generating unit in the appearance order.

10. An image processing apparatus according to claim 9, wherein the output control unit is adapted to switch and display the succeeding images generated by the generating unit at a predetermined time interval.

11. An image processing apparatus according to claim 10, wherein the predetermined time interval is based on a user's instruction.

12. An image processing apparatus according to claim 10, further comprising:
a setting unit adapted to set a time required to display from the start to the end of the succeeding images generated by the generating unit,
wherein the predetermined time interval is based on the time set by the setting unit.

13. An image processing apparatus according to claim 10, wherein the predetermined time interval is variable in accordance with movement of a cursor using a pointing device.

14. An image processing apparatus according to claim 4, further comprising:
an extracting unit adapted to extract a predetermined number of images from the continuous still images,
wherein the trimming area calculation unit is adapted to calculate the area cut out based on the trimming area determined by the trimming area determination unit regarding each of the continuous still images.

15. An image processing apparatus according to claim 14, wherein the extracting unit is adapted to extract the image from the continuous still images with respect to each predetermined number of images.

16. An image processing apparatus according to claim 2, further comprising a recording unit adapted to record the image output by the output control unit.

17. An image processing apparatus according to claim 2, wherein the output control unit is adapted to switch and output the succeeding images generated by the generating unit in appearance order.

18. An image processing apparatus according to claim 17, wherein the output control unit is adapted to switch and display the succeeding images generated by the generating unit at a predetermined time interval.

19. An image processing apparatus according to claim 18, wherein the predetermined time interval is based on a user's instruction.

20. An image processing apparatus according to claim 18, further comprising:
a setting unit adapted to set a time required to display from the start to the end of the succeeding images generated by the generating unit,
wherein the predetermined time interval is based on the time set by the setting unit.

21. An image processing apparatus according to claim 18, wherein the predetermined time interval is variable in accordance with movement of a cursor using a pointing device.

22. An image processing apparatus according to claim 1, wherein the trimming area calculation unit is adapted to calculate trimming areas of each of remaining continuous still images, the remaining still images being other than the first image and the second image in which trimming areas have been determined by the trimming area determination unit, so as to gradually change from the trimming area of the first image to the trimming area of the second image.

23. An image processing apparatus according to claim 1, wherein the trimming area calculation unit is adapted to calculate a position and/or a size of trimming areas of each of remaining continuous still images, the remaining still images being other than the first image and the second image in which trimming areas have been determined by the trimming area determination unit, so as to proportionally change from the trimming area of the first image to the trimming area of the second image.

24. An image processing apparatus according to claim 1, wherein the trimming area calculation unit is adapted to calculate a position and/or a size of trimming areas of each of remaining continuous still images, the remaining still images being other than the first image and the second image in which trimming areas have been determined by the trimming area determination unit, so as to non-proportionally change from the trimming area of the first image to the trimming area of the second image.

25. An image processing apparatus according to claim 1, further comprising:

an extracting unit adapted to extract a predetermined number of images from the continuous still images, wherein the trimming area calculation unit is adapted to calculate the area cut out based on the trimming area determined by the trimming area determination unit regarding each of the continuous still images.

26. An image processing apparatus according to claim 25, wherein the extracting unit is adapted to extract the image from the continuous still images with respect to each predetermined number of images.

27. A method for controlling an image processing apparatus, the method comprising:

a reading-out step of reading out continuous still images having a specific order from a recording medium;

a trimming area determination step of determining trimming areas of a first image and a second image from continuous still images read out in the reading-out step;

a trimming area calculation step of calculating a trimming area based on positions and/or sizes of the trimming areas of the first image and the second image determined by the trimming area determination step, with respect to each image of which its order is between the first image and the second image among the still continuous images, wherein a position and/or a size of the trimming area of each image of which its order is between the first image and the second image are different from the positions and/or sizes of the trimming areas of the first image and the second image determined in the trimming area determination step, the trimming area of each image of which its order is between the first image and the second image being part of an entire area in which each image is recorded; and a generating step of generating a visual effect by generating succeeding images by using images cut out with the trimming area determined in the trimming area determination step and images cut out with the trimming area calculated in the trimming area calculation step.

28. A computer-readable medium having a stored computer program in a storage medium for controlling an image processing comprising:

computer-executable instructions for reading out continuous still images having a specific order from a recording medium;

computer-executable instructions for determining trimming areas of a first image and a second image from continuous still images read out;

computer-executable instructions for calculating a trimming area based on positions and/or sizes of the trimming areas of the determined first image and the determined second image, with respect to each image of which its order is between the first image and the second image among the continuous still images, wherein a position and/or a size of the trimming area of each image of which its order is between the first image and the second image are different from the positions and/or sizes of the trimming areas of the determined first image and the determined second image, the trimming area of each image of which its order is between the first image and the second image being a part of an entire area in which each image is recorded; and computer-executable instructions for generating a visual effect by generating succeeding images by using images cut out with the trimming areas of the first and second images and the trimming areas of each image of which its order is between the first image and the second image.

29. An image processing apparatus according to claim 1, wherein the visual effect is a zoom effect.

30. An image processing apparatus according to claim 1, wherein the visual effect is a pan effect.

* * * * *